(12) United States Patent
Ohta et al.

(10) Patent No.: US 7,573,675 B2
(45) Date of Patent: Aug. 11, 2009

(54) THIN FILM MAGNETIC HEAD

(75) Inventors: Naoki Ohta, Tokyo (JP); Kazuki Sato, Tokyo (JP); Noriaki Kasahara, Tokyo (JP); Takeo Kagami, Tokyo (JP)

(73) Assignee: TDK Corporation, Tokyo (JP)

( * ) Notice: Subject to any disclaimer, the term of this patent is extended or adjusted under 35 U.S.C. 154(b) by 408 days.

(21) Appl. No.: 11/374,167

(22) Filed: Mar. 14, 2006

(65) Prior Publication Data

US 2006/0209470 A1    Sep. 21, 2006

(30) Foreign Application Priority Data

Mar. 18, 2005    (JP)    ............ P2005-080256
Jan. 4, 2006    (JP)    ............ P2006-000194

(51) Int. Cl.
*G11B 5/31*    (2006.01)
(52) U.S. Cl. .................... 360/123
(58) Field of Classification Search ............ None
See application file for complete search history.

(56) References Cited

U.S. PATENT DOCUMENTS

| 7,046,487 | B2 |   | 5/2006 | Terunuma |            |
|-----------|----|---|--------|----------|------------|
| 7,218,485 | B2 | * | 5/2007 | Hasegawa et al. | 360/324.11 |
| 7,229,706 | B2 | * | 6/2007 | Hasegawa et al. | 428/811.5 |
| 7,243,412 | B2 | * | 7/2007 | Furukawa et al. | 29/603.14 |
| 7,274,540 | B2 | * | 9/2007 | Sano | 360/319 |

FOREIGN PATENT DOCUMENTS

| JP | A-07-014118 | 1/1995 |
| JP | A-07-169023 | 7/1995 |
| JP | A 09-288806 | 11/1997 |
| JP | A-2003-059012 | 2/2003 |
| JP | A-2004-127420 | 4/2004 |
| JP | A-2004-514231 | 5/2004 |
| WO | WO 02/007153 A3 | 1/2002 |

* cited by examiner

*Primary Examiner*—Mark Blouin
(74) *Attorney, Agent, or Firm*—Oliff & Berridge, PLC

(57) ABSTRACT

A thin film magnetic head has an air bearing surface and comprises magnetic shield layers, an MR element, bias-applying layers, and a hard magnetic layer. Each of the magnetic shield layers has an end face forming the air bearing surface, and an end face located opposite to the end face. The MR element is located between the magnetic shield layers and on the end face side. The bias-applying layers are located between the magnetic shield layers and are arranged to apply a bias magnetic field to the MR element. The hard magnetic layer is located between the magnetic shield layers and on the end face side. A height of the hard magnetic layer is larger than $1/3$ and smaller than $1/2$ of a height of each magnetic shield layer.

13 Claims, 26 Drawing Sheets

Fig.4
(a) 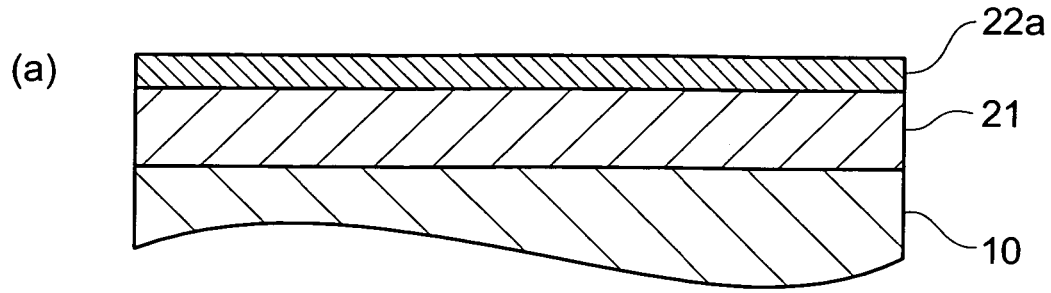
(b) 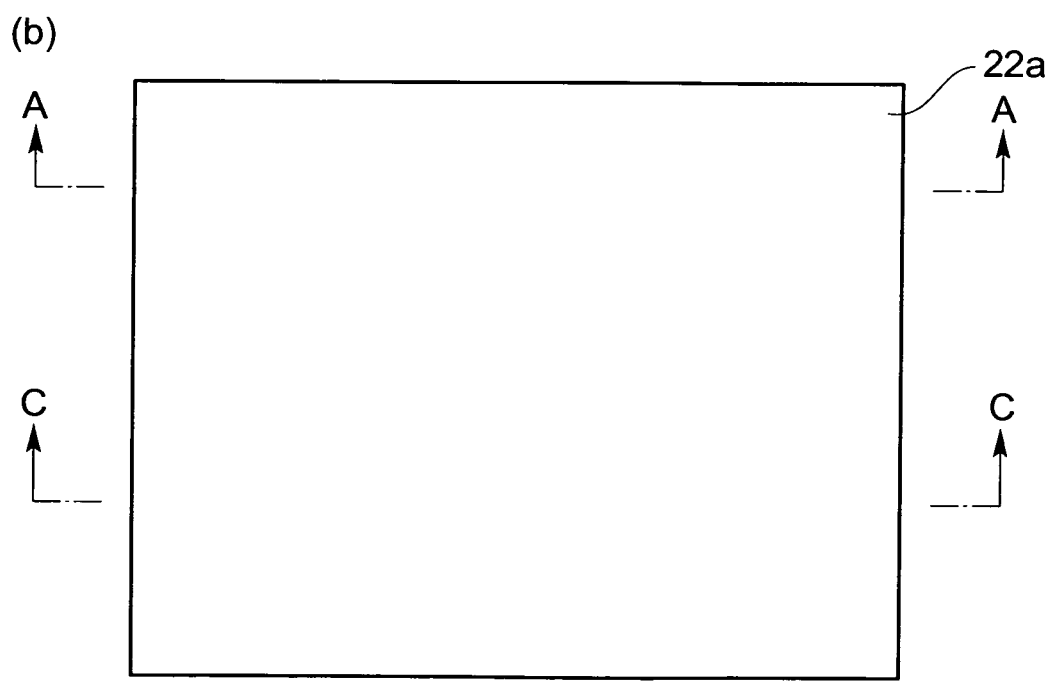
(c) 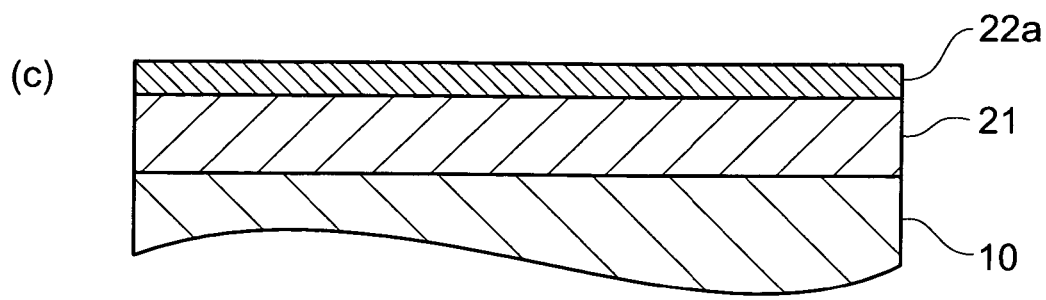

Fig.20
(a)
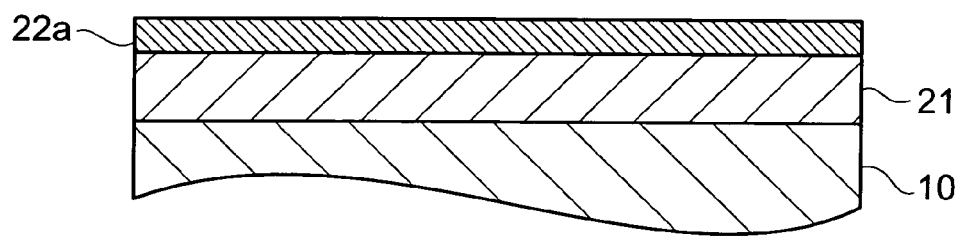
(b)
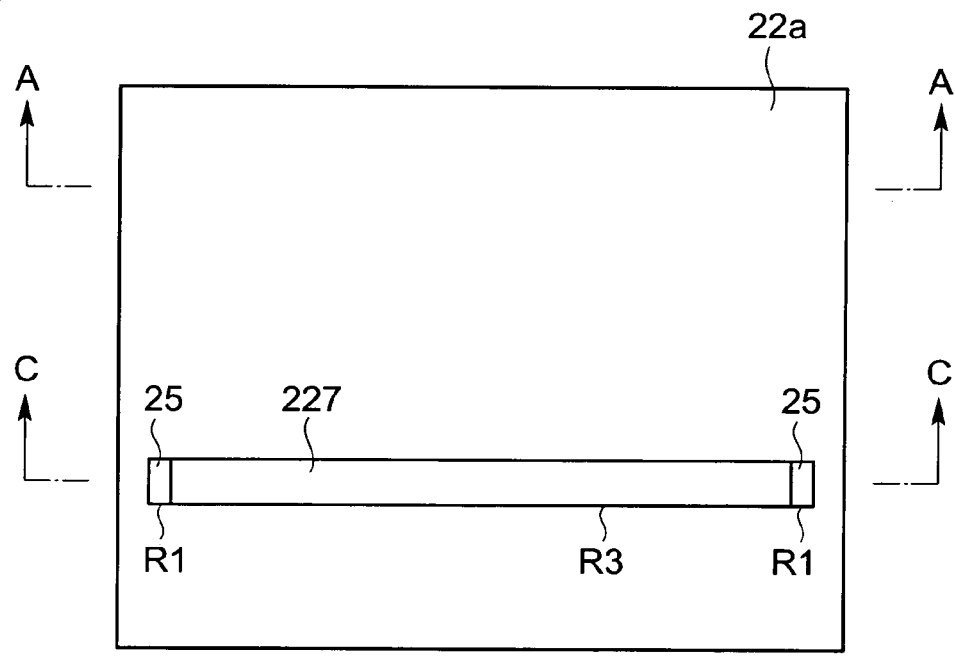
(c)
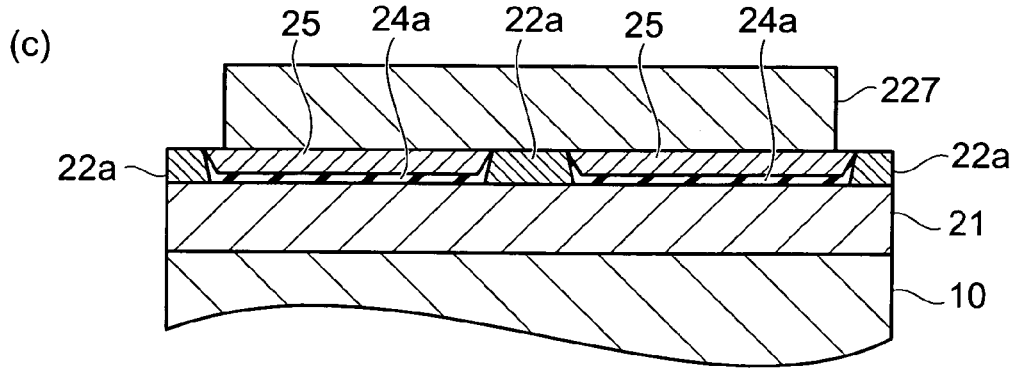

THIN FILM MAGNETIC HEAD

BACKGROUND OF THE INVENTION

1. Field of the Invention

The present invention relates to a thin film magnetic head.

2. Related Background Art

An example of the known thin film magnetic heads for reading magnetic information in magnetic media such as hard disks is a thin film magnetic head comprising a magnetoresistive effect element (hereinafter referred to as an MR (MagnetoResistive) element), and magnetic shield layers provided through a nonmagnetic insulating layer on both upper and lower sides of the MR element (e.g., Japanese Patent Application Laid-Open No. 9-288806)

Incidentally, there are demands for decrease of Barkhausen noise as a property of a reproducing head included in the thin film magnetic head.

An object of the present invention is therefore to provide a thin film magnetic head capable of achieving adequate reduction in Barkhausen noise.

SUMMARY OF THE INVENTION

The Barkhausen noise appears in a magnetic signal of the reproducing head when the magnetization direction of a free layer in the MR element is subject to fluctuation. This is because the domain structure of the magnetic shield layers readily undergoes a transition by virtue of an external impact, a change of an external magnetic field, etc., so as to irregularly fluctuate the magnetization direction of the free layer.

Then the Inventors conducted elaborate research on the thin film magnetic head capable of achieving adequate reduction of the Barkhausen noise. As a result, the Inventors found the new fact that the domain structure of the magnetic shield layers can be stabilized by providing a hard magnetic layer or an antiferromagnetic layer, particularly, between a pair of magnetic shield layers and on the end face side located opposite to an end face forming a medium-facing surface of the pair of magnetic shield layers.

In light of this research result, a thin film magnetic head according to the present invention is a thin film magnetic head having a medium-facing surface, comprising: a pair of magnetic shield layers facing each other, each magnetic shield layer having a first end face forming the medium-facing surface and a second end face located opposite to the first end face; a magnetoresistive effect element located between the pair of magnetic shield layers and located on the first end face side; a bias-applying layer located between the pair of magnetic shield layers and arranged to apply a bias magnetic field to the magnetoresistive effect element; and a hard magnetic layer located between the pair of magnetic shield layers and located on the second end face side, wherein a length of the hard magnetic layer in a direction perpendicular to the first end face is larger than $1/3$ and smaller than $1/2$ of a length of the magnetic shield layers between the first end face and the second end face.

In the thin film magnetic head according to the present invention, the hard magnetic layer is located between the pair of magnetic shield layers. For this reason, a static magnetic field generated from the hard magnetic layer acts on each magnetic shield layer. Therefore, where the magnetization direction of the magnetic domain in the magnetic shield layer is opposite to a direction of the static magnetic field by the hard magnetic layer, this state is disadvantageous in terms of magnetic energy and thus results in decreasing the region of the magnetic domain with the magnetic moment opposite to the static magnetic field. On the other hand, where the magnetization direction of the magnetic domain in the magnetic shield layer is the same as the direction of the static magnetic field by the hard magnetic layer, this state is advantageous in terms of magnetic energy and thus results in increasing the region of the magnetic domain with the magnetic moment in the same direction as the static magnetic field. In this configuration, the hard magnetic layer is located on the second end face side opposite to the first end face forming the medium-facing surface of the magnetic shield layers and the length of the hard magnetic layer in the direction perpendicular to the first end face is larger than $1/3$ and smaller than $1/2$ of the length of the magnetic shield layers between the first end face and the second end face. For this reason, an approximately half region on the second end face side in the magnetic shield layers comes to have the same direction as the direction of the static magnetic field generated from the hard magnetic layer, and the number of magnetic domains in the magnetic shield layers is likely to become approximately 4. Therefore, it becomes easier to maintain the domain structure of the magnetic shield layers as the 4-domain structure with extremely small magnetic energy, which can suppress the transition of the domain structure in the magnetic shield layers and thus stabilize the domain structure. In consequence, it becomes feasible to achieve adequate reduction of the Barkhausen noise. Since in the thin film magnetic head of the present invention the hard magnetic layer is located on the second end face side of the magnetic shield layers, the static magnetic field generated from the hard magnetic layer causes little direct influence on the magnetization direction of the free layer in the magnetoresistive effect element located on the first end face side of the magnetic shield layers.

In a preferred configuration, when viewed from a stack direction, the hard magnetic layer is rectangular and a side of the hard magnetic layer is arranged in parallel with the first end face. This configuration makes it easier to maintain the magnetic shield layers in the 4-domain structure.

In this case, preferably, when viewed from the stack direction, a length of the hard magnetic layer in a direction along the first end face is larger than the length of the hard magnetic layer in the direction perpendicular to the first end face. Since this configuration increases the area of the hard magnetic layer relative to the magnetic shield layers, it becomes much easier to maintain the magnetic shield layers in the 4-domain structure.

In another preferred configuration, a thickness of the hard magnetic layer in the stack direction is equal to a thickness of the bias-applying layer in the stack direction. This configuration permits the hard magnetic layer to be produced together with the bias-applying layer in a single step.

In another preferred configuration, when viewed from the stack direction, a length of the pair of magnetic shield layers in the direction along the first end face is larger than the length of the pair of magnetic shield layers in the direction perpendicular to the first end face. This configuration makes it further easier to maintain the magnetic shield layers in the 4-domain structure.

In another preferred configuration, a direction of magnetization of the hard magnetic layer is the same as a direction of the bias magnetic field of the bias-applying layer. The thin film magnetic head of this configuration can be produced by magnetizing the bias-applying layer and the hard magnetic layer in a single step.

Another thin film magnetic head according to the present invention is a thin film magnetic head having a medium-facing surface, comprising: a pair of magnetic shield layers facing each other, each magnetic shield layer having a first end face forming the medium-facing surface and a second end face located opposite to the first end face; a magnetoresistive effect element located between the pair of magnetic shield layers and located on the first end face side; a bias-applying layer located between the pair of magnetic shield layers and arranged to apply a bias magnetic field to the magnetoresistive effect element; and a first antiferromagnetic layer located between the pair of magnetic shield layers, located on the second end face side, and arranged in contact with one of the pair of magnetic shield layers, wherein a length of the first antiferromagnetic layer in a direction perpendicular to the first end face is larger than ⅓ and smaller than ½ of a length of the magnetic shield layers in the direction perpendicular to the first end face.

In the thin film magnetic head according to the present invention, the first antiferromagnetic layer is in contact with one of the pair of magnetic shield layers. For this reason, the direction of magnetization in the region of the magnetic shield layer in contact with the first antiferromagnetic layer is fixed by exchange interaction with the antiferromagnetic layer. In this configuration, the first antiferromagnetic layer is located on the second end face side opposite to the first end face forming the medium-facing surface of the magnetic shield layers, and the length of the first antiferromagnetic layer in the direction perpendicular to the first end face is larger than ⅓ and smaller than ½ of the length of the magnetic shield layers between the first end face and the second end face. For this reason, the direction of magnetization in an approximately half region on the second end face side in the magnetic shield layer is fixed by the first antiferromagnetic layer, and the number of magnetic domains in the magnetic shield layer is likely to become approximately 4. Therefore, it becomes easier to maintain the domain structure of the magnetic shield layer as the 4-domain structure with extremely small magnetic energy, which can suppress the transition of the domain structure in the magnetic shield layer and stabilize the domain structure. In consequence, it becomes feasible to achieve adequate reduction of the Barkhausen noise.

In a preferred configuration, the thin film magnetic head further comprises a second antiferromagnetic layer located between the pair of magnetic shield layers, located on the second end face side, and arranged in contact with the other of the pair of magnetic shield layers; a length of the second antiferromagnetic layer in the direction perpendicular to the first end face is larger than ⅓ and smaller than ½ of the length of the magnetic shield layers in the direction perpendicular to the first end face. In this configuration, the direction of magnetization in the region of the other magnetic shield layer in contact with the second antiferromagnetic layer is also fixed by the second antiferromagnetic layer. In this case, the location and size of the second antiferromagnetic layer are the same as those of the first antiferromagnetic layer, and thus the number of magnetic domains in each magnetic shield layer is likely to become approximately 4. Therefore, it becomes easier to maintain the domain structure of each magnetic shield layer as the 4-domain structure with extremely small magnetic energy, which can suppress the transition of the domain structure in each magnetic shield layer and stabilize the domain structure. In consequence, it becomes feasible to achieve further reduction of the Barkhausen noise.

In a preferred configuration, when viewed from a stack direction, the antiferromagnetic layer is rectangular and one side of the antiferromagnetic layer is arranged in parallel with the first end face. This configuration makes it easier to maintain the magnetic shield layers in the 4-domain structure.

In another preferred configuration, when viewed from the stack direction, a length of the antiferromagnetic layer in a direction along the first end face is larger than the length of the antiferromagnetic layer in the direction perpendicular to the first end face. This configuration increases the area of the antiferromagnetic layer relative to the magnetic shield layers and thus makes it much easier to maintain the magnetic shield layers in the 4-domain structure.

In still another preferred configuration, when viewed from the stack direction, a length of the pair of magnetic shield layers in the direction along the first end face is larger than the length of the pair of magnetic shield layers in the direction perpendicular to the first end face. This configuration makes it further easier to maintain the magnetic shield layers in the 4-domain structure.

The present invention successfully provides the thin film magnetic head capable of stabilizing the domain structure of the magnetic shield layers and achieving adequate reduction of the Barkhausen noise.

BRIEF DESCRIPTION OF THE DRAWINGS

FIG. 4 is a drawing including (a) and (c) sectional views along direction A-A and along direction C-C, respectively, in (b) showing a step in a production process of the reproducing head portion according to the first embodiment, and (b) a plan view showing the step in the production process of the reproducing head portion according to the first embodiment.

FIG. 20 is a drawing including (a) and (c) sectional views along direction A-A and along direction C-C, respectively, in (b) showing a subsequent step to FIG. 19, and (b) a plan view showing the subsequent step to FIG. 19.

DESCRIPTION OF THE PREFERRED EMBODIMENTS

Figure 1:
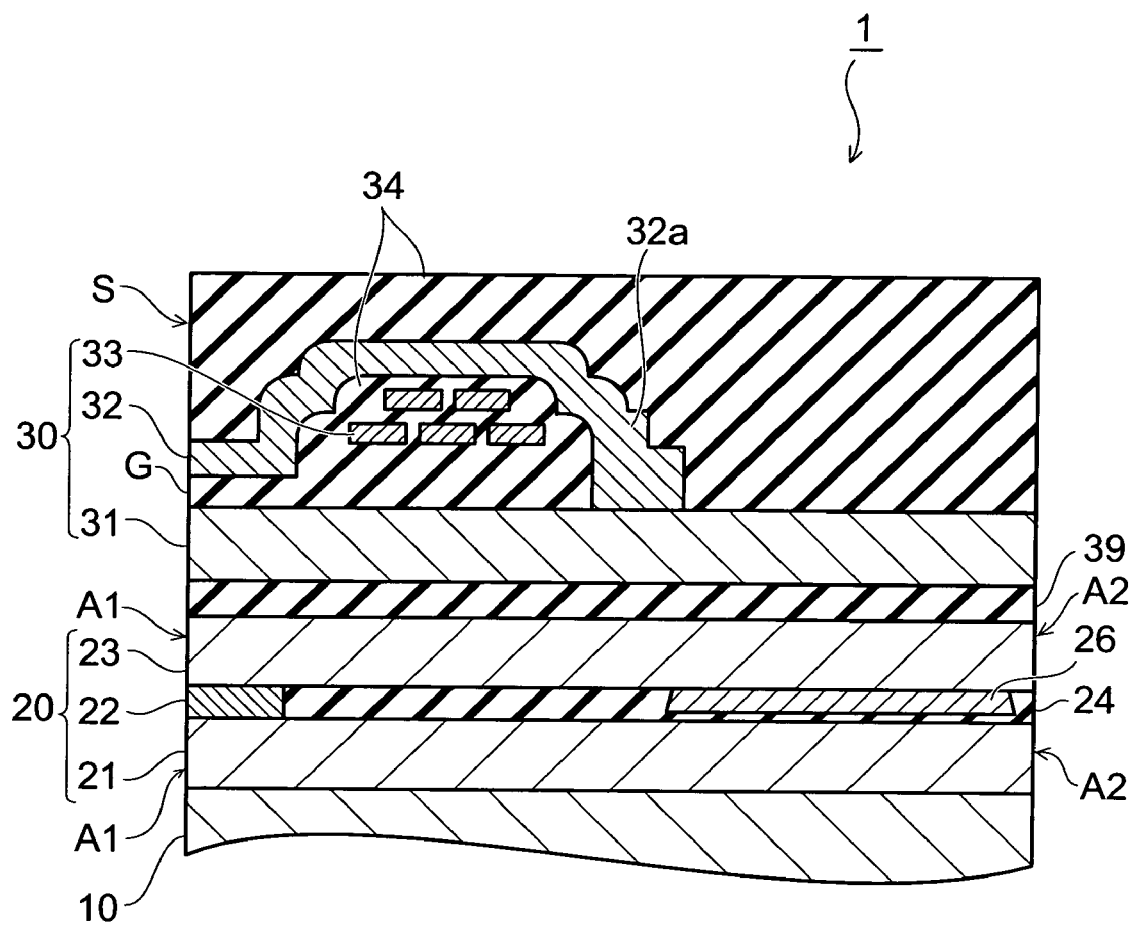
FIG. 1 is a schematic sectional view of a thin film magnetic head taken along a direction normal to a medium-facing surface of the thin film magnetic head according to the first embodiment and viewed from a track width direction.

Thin film magnetic heads according to embodiments of the present invention will be described with reference to the drawings. In the description the same elements or elements with the same function will be denoted by the same reference symbols, without redundant description. The terms "upper" and "lower" will be used in the description and they correspond to the vertical directions in the drawings.

First Embodiment (Configuration of Thin Film Magnetic Head)

Figure 2:
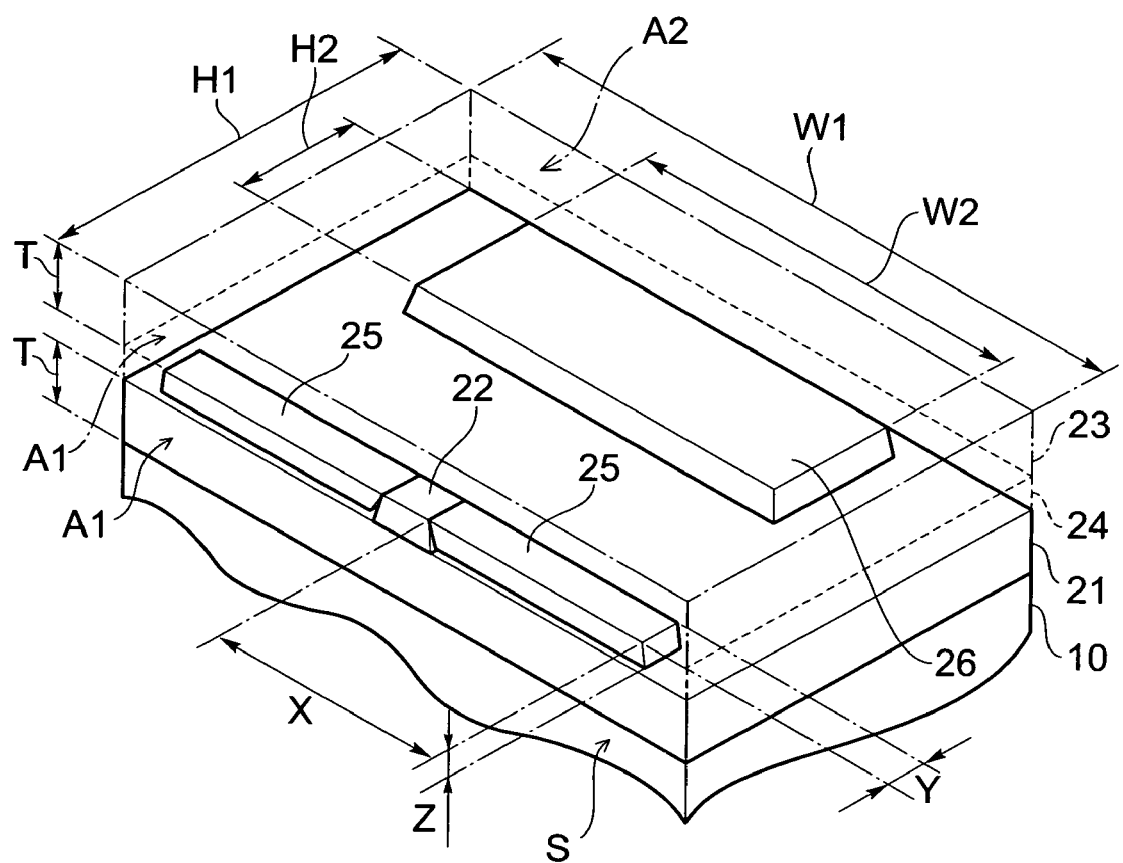
FIG. 2 is a perspective view showing a part of a reproducing head portion according to the first embodiment.

A configuration of thin film magnetic head 1 according to the first embodiment will be described with reference to FIGS. 1 and 2. FIG. 1 is a schematic sectional view of the thin film magnetic head taken along a direction normal to a medium-facing surface (also called an air bearing surface (ABS: AirBearing Surface)) of the thin film magnetic head according to the first embodiment and viewed from the track width direction. FIG. 2 is a perspective view showing a part of the thin film magnetic head according to the first embodiment.

The thin film magnetic head 1 is provided over a base 10 and forms a part of an unrepresented magnetic head slider. The thin film magnetic head 1 is a composite thin film magnetic head in which a reproducing head portion 20 having an after-described MR (magnetoresistance effect: MagnetoResistive) element 22, an insulating layer 39, and a recording head portion 30 as an induction type electromagnetic conversion element for writing are successively stacked on the base 10. In the thin film magnetic head 1, the left end face in FIG. 1 is the recording medium-facing surface (air bearing surface S) facing a recording surface of a hard disk not shown. The base 10 is constructed by forming a ground layer of an electrically insulating material such as alumina ($Al_2O_3$) in the thickness of about 0.3-5.0 μm on a substrate of AlTiC ($Al_2O_3$.TiC).

The reproducing head portion 20 is constructed in a configuration in which a lower magnetic shield layer 21 also serving as a lower electrode, an MR element 22, and an upper magnetic shield layer 23 also serving as an upper electrode are stacked in the order named, on the base 10. A pair of bias-applying layers 25 of a hard magnetic material are formed through an insulating layer 24 on both sides of the MR element 22 in the track width direction. Furthermore, a hard magnetic layer 26 similarly of a hard magnetic material is formed in the same layer as the bias-applying layers 25.

The lower magnetic shield layer 21 and upper magnetic shield layer 23 are made of a soft magnetic material such as NiFe (permalloy) and prevent the MR element 22 from sensing an unwanted external magnetic field. Each magnetic shield layer 21, 23 is of an approximately rectangular shape, when viewed from the stack direction, and has an end face A1 forming the air bearing surface S, and an end face A2 opposite to this end face A1. In each magnetic shield layer 21, 23, a length (width of each magnetic shield layer 21, 23) W1 in the direction along the end face A1 is longer than a length (height of each magnetic shield layer 21, 23) H1 in the depth direction from the end face A1. Namely, in each magnetic shield layer 21, 23, for example, the width W1 is set to approximately 50-100 μm and the height H1 to approximately 20-50 μm. The thickness T of each magnetic shield layer 21, 23 is set, for example, to approximately 1-3 μm.

The MR element 22 is a multilayer structure including a free layer (not shown), and is located on the air bearing surface S side so as to be exposed in the air bearing surface S. The MR element 22 detects a change of a magnetic field incoming from a hard disk to read out magnetic information recorded in the hard disk, by making use of the magnetoresistance effect. The MR element 22 may be replaced by a GMR (Giant MagnetoResistive) element making use of the giant magnetoresistance effect with high magnetoresistance change rate, an AMR (Anisotropy MagnetoResistive) element making use of the anisotropic magnetoresistance effect, a TMR (Tunnel MagnetoResistive) element making use of the magnetoresistance effect occurring at a tunnel junction, a CPP-GMR element, or the like.

Figure 3:
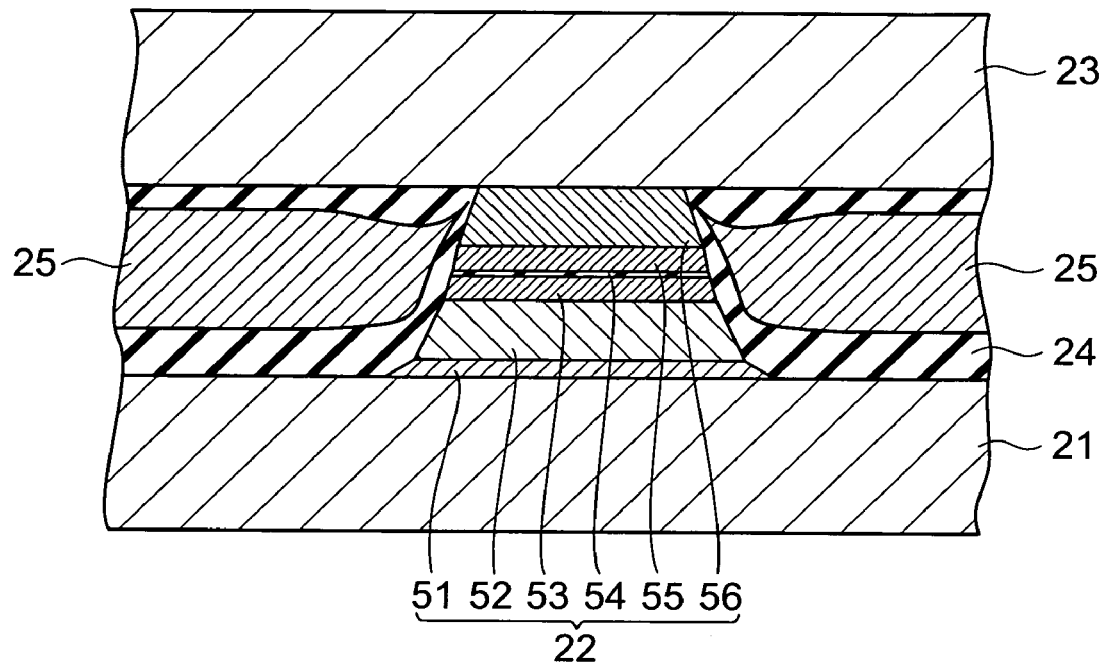
FIG. 3 is a schematic sectional view showing the major part of a TMR element.

A structure of a TMR element as one form of the MR element 22 will be described with reference to FIG. 3. The TMR element is constructed in a configuration in which a lower metal layer 51, a pin layer 52, a pinned layer 53, a tunnel barrier layer 54, a free layer 55, and an upper metal layer 56 are stacked in the order named. In the TMR element a sense current flows in the stack direction of the layers forming the TMR element.

The lower metal layer 51 is made of a nonmagnetic, electrically conductive metal material such as Ta, and is provided for adjusting a read gap according to a recording density of a recording medium to a desired value. The pin layer 52 is made of an antiferromagnetic material such as PtMn or NiO and is formed on the lower metal layer 51. In this case, the lower metal layer 51 functions as a ground layer. The pinned layer 53 is made of a soft magnetic material such as Fe, Co, Ni, NiFe, CoFe, CoZrNb, or FeCoNi and is formed on the pin layer 52. The direction of magnetization of the pinned layer 53 is fixed along a certain direction (e.g., a direction perpendicular to the air bearing surface S) by exchange coupling occurring at the interface between the pin layer 52 and the pinned layer 53. The tunnel barrier layer 54 is arranged so that an electron can pass while maintaining its spin by the tunneling effect, and it can be made of an insulating material, for example, such as $Al_2O_3$, NiO, MgO, $Ta_2O_5$, or $TiO_2$. The free layer 55 is made of a soft magnetic material such as Fe, Co, Ni, NiFe, CoFe, CoZrNb, or FeCoNi, and is formed on the tunnel barrier layer 54. The direction of magnetization of the free layer 55 varies according to a leak magnetic field from a recording medium, i.e., an external magnetic field. The upper metal layer 56 is made of a nonmagnetic, electrically conductive metal material such as Ta, and is formed on the free layer 55. This upper metal layer 56 is provided for adjusting the read gap according to the recording density of the recording medium to the desired value as the lower metal layer 51 was.

Referring back to FIGS. 1 and 2, the insulating layer 24 is made of a nonmagnetic insulating material such as $Al_2O_3$ or $SiO_2$ and prevents an electric current flowing through the free layer and others in the MR element 22 from leaking to the bias-applying layers 25.

The bias-applying layers 25 are made of a hard magnetic material such as CoTa, CoCrPt, or CoPt. The bias-applying layers 25 are arranged as spaced from each other on both sides of the MR element 22 in the track width direction so as to sandwich the MR element 22 between them. The bias-applying layers 25 are arranged to apply a bias magnetic field to the MR element 22 to temporarily align orientations of magnetization directions of the free layer in the MR element 22, thereby changing the free layer into a single domain structure. In the bias-applying layers 25, as shown in FIG. 2, for example, the length (width) X in the direction along the end face A1 can be approximately 2.0-10.0 μm, the length (depth) Y in the direction perpendicular to the end face A1 approximately 0.05-6.0 μm, and the thickness Z in the stack direction approximately 100-500 nm.

The hard magnetic layer 26 is made of a hard magnetic material such as CoTa, CoCrPt, or CoPt as the bias-applying layers 25 were. The hard magnetic layer 26 is of an approximately rectangular shape, when viewed from the stack direction, and is arranged on the end face A2 side of each magnetic shield layer 21, 23. The hard magnetic layer 26, when viewed from the stack direction, is arranged so that its longer sides are parallel to the direction along the end faces A1, A2 of each magnetic shield layer 21, 23. When viewed from the stack direction, the length of the sides of the hard magnetic layer 26 (height of hard magnetic layer 26) H2 in the direction perpendicular to the end face A1 is smaller than the length of the sides (width of hard magnetic layer 26) W2 in the direction along the end face A1 and is larger than ⅓ and smaller than ½ of the height H1 of each magnetic shield 21, 23. Namely, the hard magnetic layer 26 is set, for example, so that the width W2 is approximately ½ to ⅘ of the width W1. Furthermore, the thickness of the hard magnetic layer 26 is set, for example, to approximately 100 to 500 nm.

The insulating layer 39 is located so as to be sandwiched between the reproducing head portion 20 and the recording head portion 30, and is made of a nonmagnetic insulating material such as $Al_2O_3$ or $SiO_2$. The thickness of the insulating layer 39 can be set, for example, to approximately 0.1-2.0 μm.

The recording head portion 30 has a lower pole layer 31 and an upper pole layer 32 in order from the base 10 side and further has a thin film coil 33. An insulating layer 34 of a nonmagnetic insulating material such as $Al_2O_3$ or $SiO_2$ is formed between the lower pole layer 31 and the thin film coil 33, between the upper pole layer 32 and the thin film coil 33, and over the upper pole layer 32.

The lower pole layer 31 and upper pole layer 32 are made of a high saturation flux density material such as FeAlN, FeN, FeCo, CoFeN, or FeZrN. Ends of the respective pole layers 31, 32 on the air bearing surface S side are exposed in the air bearing surface S with a predetermined space between them to form a recording gap G. On the other hand, an end 32a of the upper pole layer 32 on the far side from the air bearing surface S is connected to the lower pole layer 31, whereby the lower pole layer 31 and the upper pole layer 32 are magnetically coupled to each other. In this manner, the lower pole layer 31 and the upper pole layer 32 form a magnetic circuit with the gap G in between.

The thin film coil 33 is arranged so as to surround the end 32a in the upper pole layer 32 and is arranged to generate a magnetic field in the recording gap G by electromagnetic induction, thereby recording magnetic information on the recording surface of the hard disk.

(Production Method of Reproducing Head Portion)

Next, a production method of reproducing head portion 20 forming the thin film magnetic head 1 will be described with reference to FIGS. 4 to 8. Each (a) in FIGS. 4 to 8 is a sectional view along direction A-A in each (b) in FIGS. 4 to 8 showing the production process of the reproducing head portion according to the first embodiment. Each (b) in FIGS. 4 to 8 is a plan view showing the production process of the reproducing head portion according to the first embodiment. Each (c) in FIGS. 4 to 8 is a sectional view along direction C-C in each (b) in FIGS. 4 to 8 showing the production process of the reproducing head portion according to the first embodiment. Each drawing shows only one element, but in general a plurality of thin film magnetic heads are produced from one substrate (wafer).

First, the step shown in FIG. 4 is to successively deposit a lower magnetic shield layer 21 and an MR layer 22a for MR element 22 in respective predetermined thicknesses on a base 10 in which a ground layer of an insulating material is formed on a substrate of AlTiC. A forming method is, for example, to form the lower magnetic shield layer 21 by wet plating and to form the MR layer 22a by sputtering, but a variety of known techniques other than it can also be adopted. For providing the lower magnetic shield layer 21 and MR layer 22a with desired magnetic anisotropy, each layer is formed while applying a magnetic field according to need as well known, or each layer is subjected to a thermal treatment after formed.

Figure 5:
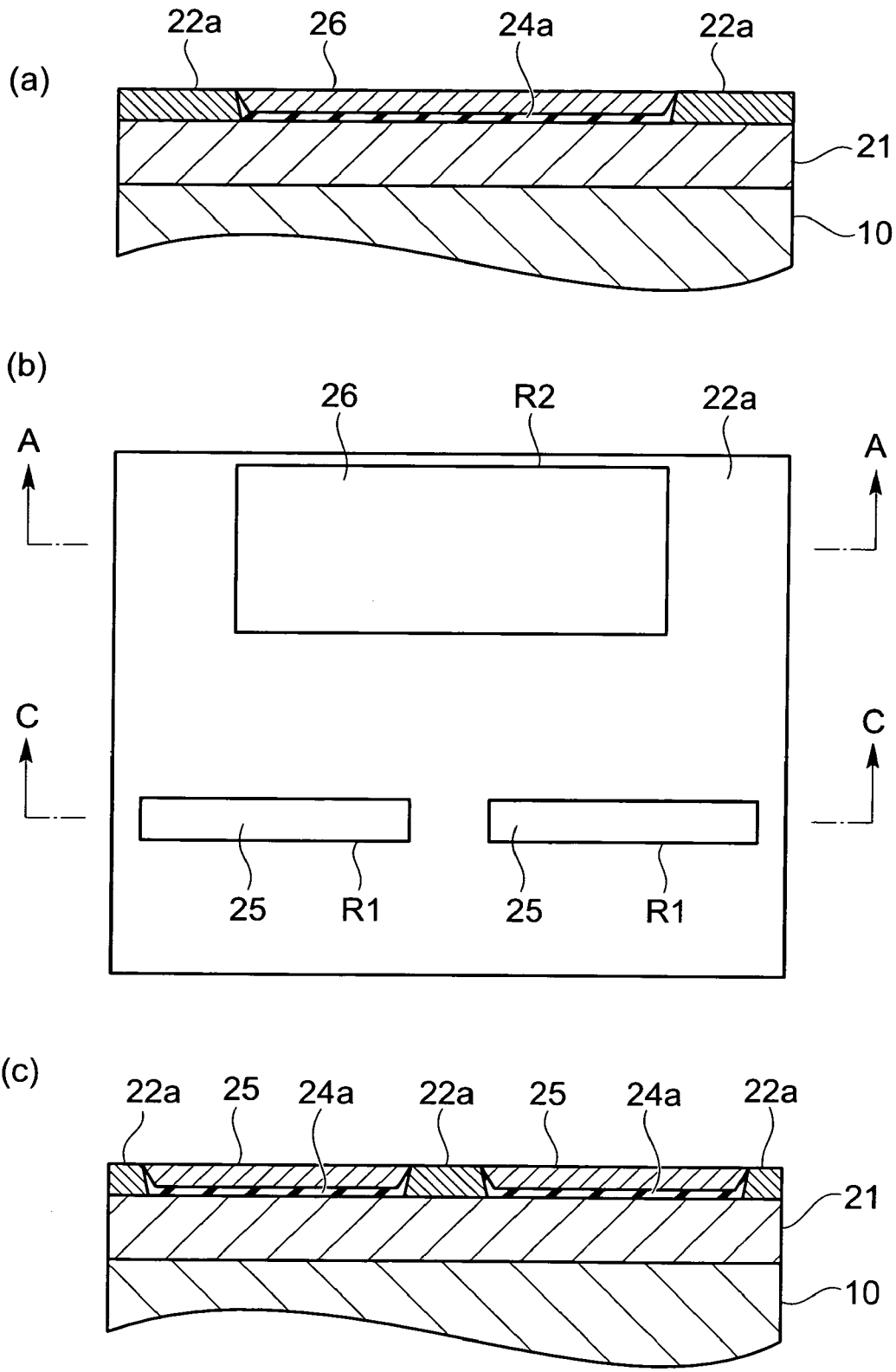
FIG. 5 is a drawing including (a) and (c) sectional views along direction A-A and along direction C-C, respectively, in (b) showing a subsequent step to FIG. 4, and (b) a plan view showing the subsequent step to FIG. 4.

Next, the next step will be described with reference to FIG. 5. First, a resist film is formed over the MR layer 22a so as to expose two regions R1 where the bias-applying layers 25 are to be formed, and a region R2 where the hard magnetic layer 26 is to be formed. The resist film is formed by applying a resist material, which polymerizes with irradiation of light or an electron beam, onto the surface of MR film 22a, exposing the resist material to light or an electron beam, and thereafter developing it. After the resist film is formed, the MR film 22a is in a state in which the surface thereof is exposed in the regions R1, R2. Then, using the resist film as a mask, the exposed regions R1, R2 are removed by ion milling or the like from the surface of the MR film 22a to the surface of the lower magnetic shield layer 21.

Subsequently, in a state in which the resist film is left, an insulating film 24a of a nonmagnetic insulating material is deposited in the regions R1, R2 by sputtering or the like. Thereafter, a hard magnetic material is deposited over the insulating film 24a to form the bias-applying layers 25 in the regions R1 and to form the hard magnetic layer 26 in the region R2. Since at this time the bias-applying layers 25 and the hard magnetic layer 26 are formed in the same step, the thicknesses of the bias-applying layers 25 and the hard magnetic layer 26 in the stack direction are approximately equal to each other. Then the resist film is removed to effect liftoff, thereby removing the deposited materials on the resist film. At this time, the MR film 22a, the bias-applying layers 25, and the hard magnetic layer 26 are located on the surface of the intermediate body.

Next, the next step will be described with reference to FIG. 6. First, a resist film 27 is formed in a region R3 to cover the two bias-applying layers 25 located on the surface and in a region R4 to cover the hard magnetic layer 26 located on the surface. Here the resist film 27 is formed so as to lie across and over the two regions R1 in the region R3, in order to leave the MR layer 22a only in the predetermined portion to form the MR element 22. In the region R4 the resist film 27 is formed on the region R2 and in a rectangular shape a little smaller than the region R2. The resist film 27 is formed by applying a resist material, which polymerizes with irradiation of light or an electron beam, onto the surface of the intermediate body, exposing the resist material to light or an electron beam, and thereafter developing it. This step determines the length of MR element 22 (height of MR element 22) in the direction normal to the air bearing surface S, and the size of the hard magnetic layer 26. Then, using the resist film 27 as a mask, the exposed surface region is removed down to the surface of the lower magnetic shield layer 21 by ion milling or the like. Then an insulating film 24b of a nonmagnetic insulating material is formed over the entire surface of the intermediate body in a state in which the resist film 27 is left. Thereafter, the resist film 27 is removed to effect liftoff, thereby removing the deposited material on the resist film 27. A state at this point is shown in FIG. 7.

Figure 6:
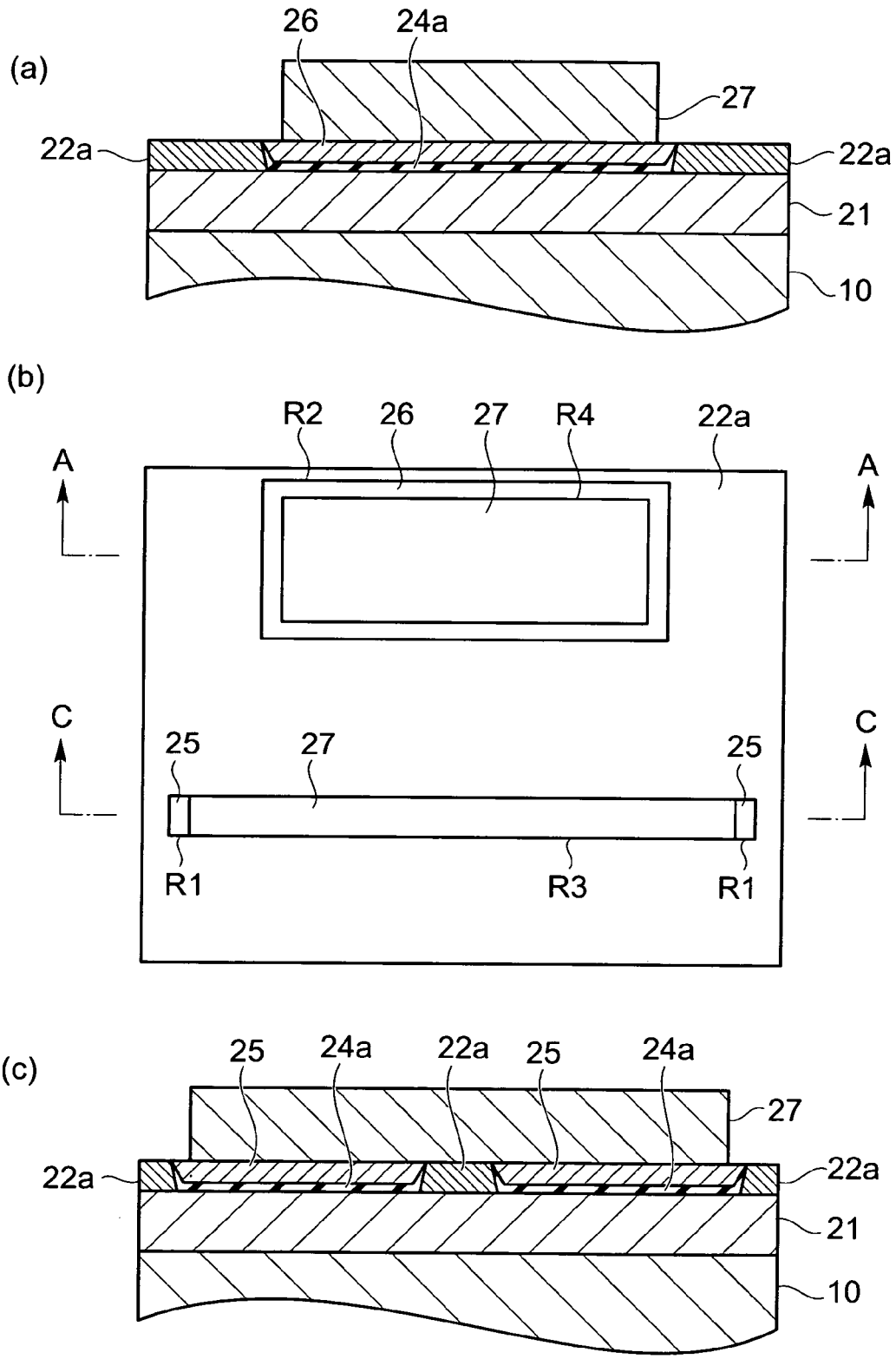
FIG. 6 is a drawing including (a) and (c) sectional views along direction A-A and along direction C-C, respectively, in (b) showing a subsequent step to FIG. 5, and (b) a plan view showing the subsequent step to FIG. 5.
Figure 7:
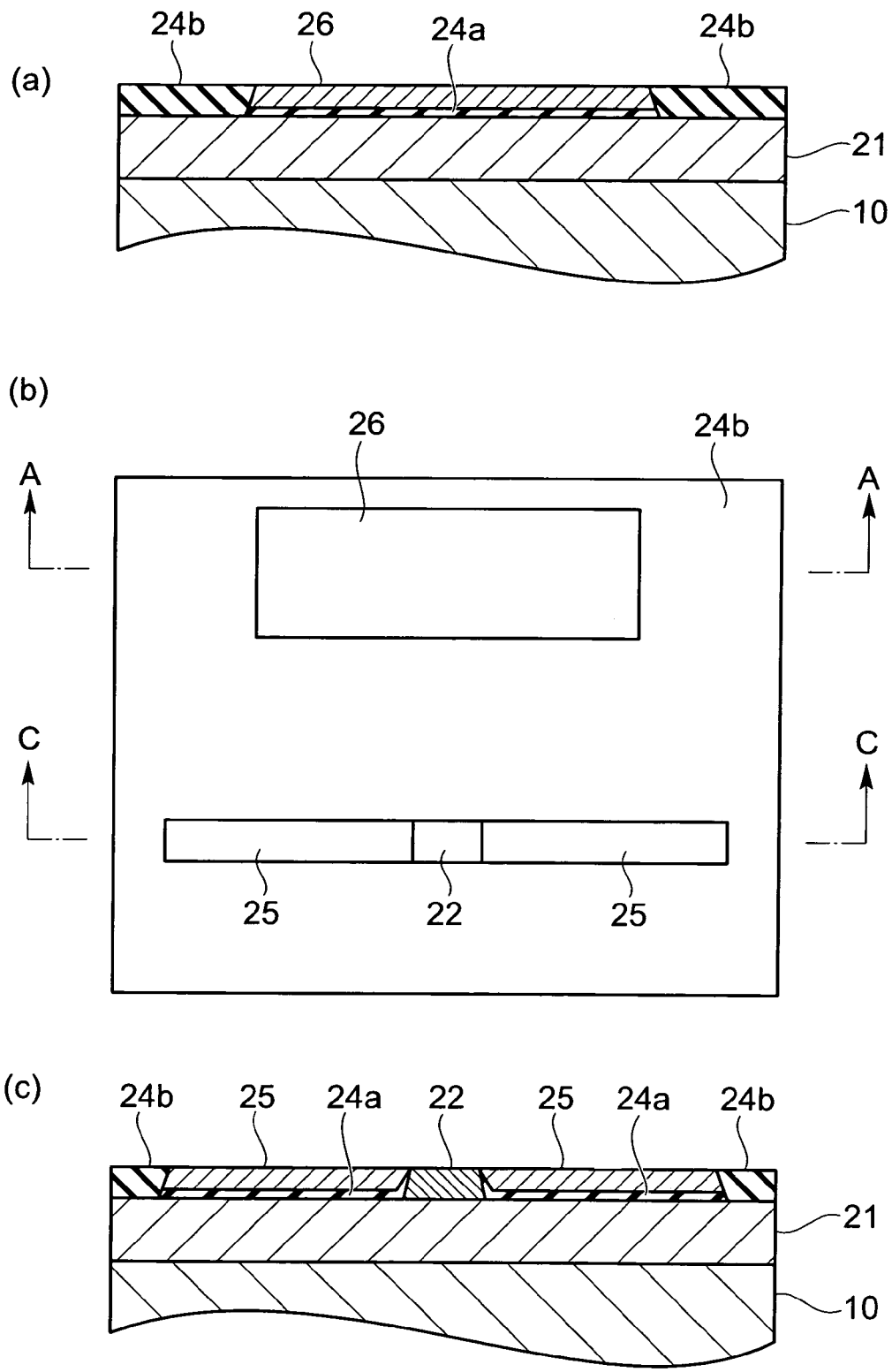
FIG. 7 is a drawing including (a) and (c) sectional views along direction A-A and along direction C-C, respectively, in (b) showing a subsequent step to FIG. 6, and (b) a plan view showing the subsequent step to FIG. 6.

At this time, the insulating film 24b lies in the region other than the region R3 and R4 in FIG. 6. The insulating layer 24 shown in FIGS. 1 and 2 is formed by the insulating film 24a formed in the step in FIG. 5 and the insulating film 24b formed in the present step.

Figure 8:
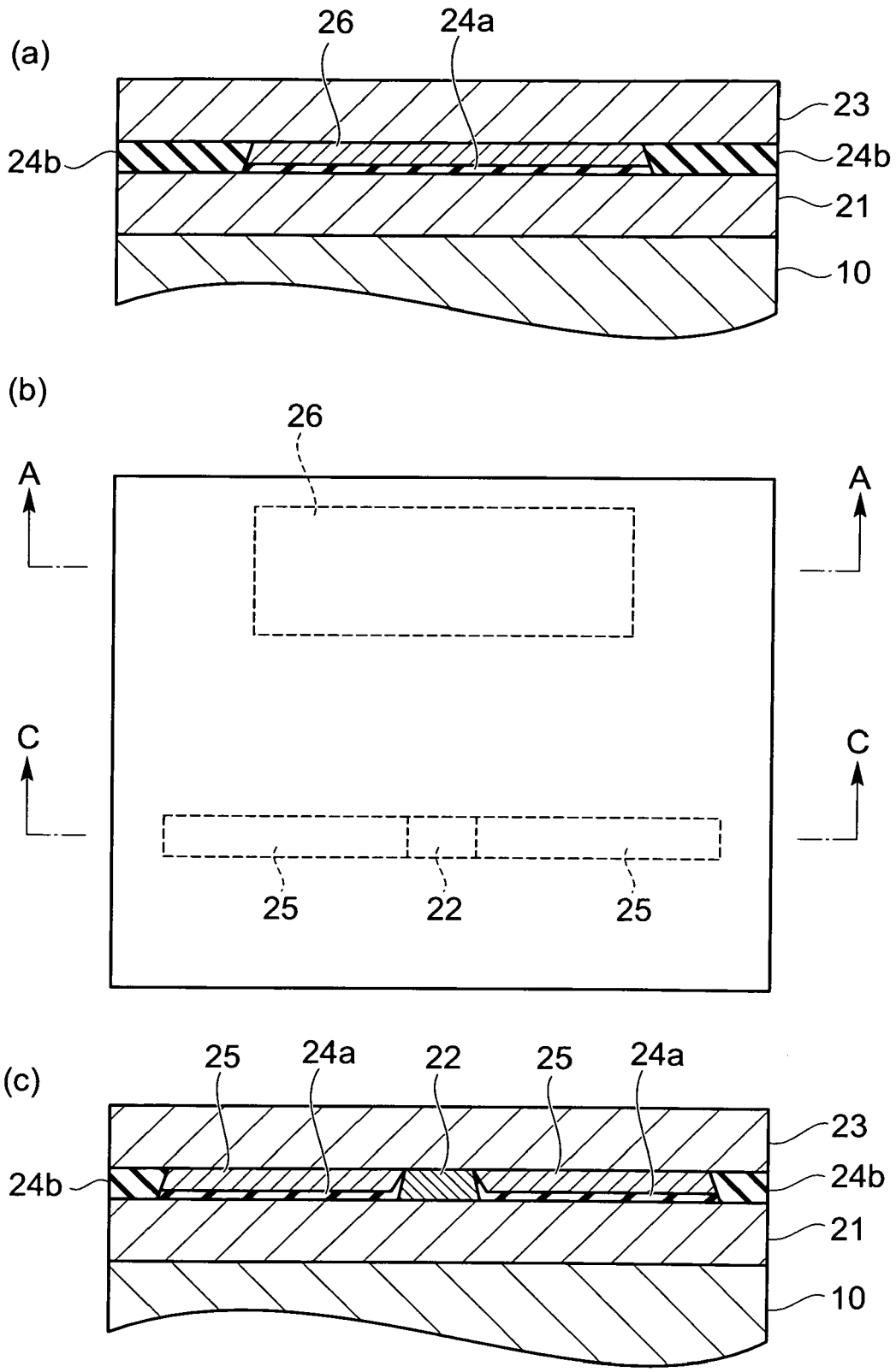
FIG. 8 is a drawing including (a) and (c) sectional views along direction A-A and along direction C-C, respectively, in (b) showing a subsequent step to FIG. 7, and (b) a plan view showing the subsequent step to FIG. 7.

Next, the next step will be described with reference to FIG. 8. An upper magnetic shield layer 23 is deposited over the entire surface of the intermediate body of the reproducing head portion obtained as described above. The upper magnetic shield layer 23 can be formed, for example, by wet plating. The reproducing head portion 20 is obtained in this manner.

The details thereafter will be omitted, but an insulating layer 39 is then deposited over the reproducing head portion 20, and thereafter the recording head portion 30 is formed on the insulating layer 39 by a well-known method or the like, thereby obtaining the thin film magnetic head 1. After the thin film magnetic head 1 is formed, a magnetic field is applied from the outside and in the direction along the air bearing surface S to the thin film magnetic head 1, whereby the bias-applying layers 25 and the hard magnetic layer 26 are magnetized both in the same direction (the direction along the air bearing surface S).

A plurality of thin film magnetic heads 1 are formed on a wafer as described above, and then a plurality of bars (not shown) are produced from the wafer by dicing. A plurality of thin film magnetic heads 1 are aligned in each bar. After the stage of producing such bars, a lapping process (polishing) for adjusting the height of MR element 22 is carried out. The lapping process involves lapping from the lapping surface to become the air bearing surface S side, into the depth direction relative to the air bearing surface S, and the lapping ends at the predetermined height of MR element 22. After completion of the lapping process, each bar is cut into block units each containing a thin film magnetic head 1, and slider rails are formed to obtain a so-called head slider. This completes the sequential production steps of thin film magnetic head 1.

(Function of Thin Film Magnetic Head)

The action of the thin film magnetic head 1 according to the embodiment of the present invention will be described.

Figure 9:
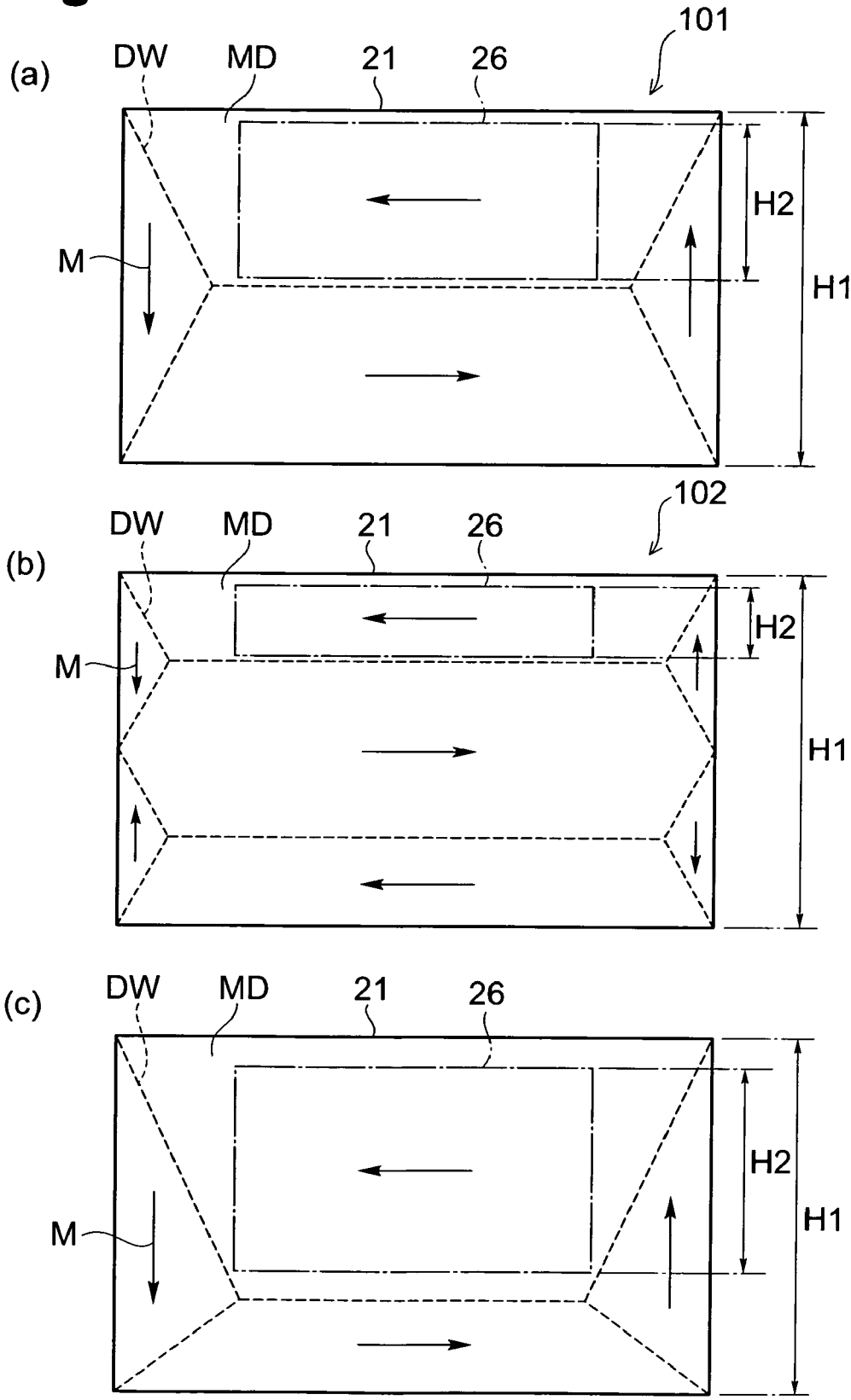
FIG. 9 is a drawing for explaining the domain structure of the magnetic shield layers that can be taken relative to the size of the hard magnetic layer.

First, the domain structure of the lower magnetic shield layer 21 will be described with reference to FIG. 9. FIG. 9 is a drawing for explaining the domain structure of the magnetic shield layer that can be taken relative to the size of the hard magnetic layer. The domain structure of the upper magnetic shield layer 23 and the magnetization directions of respective magnetic domains are much the same as those of the lower magnetic shield layer 21, and thus the description thereof will be omitted.

The lower magnetic shield layer 21 generally has domain structure 101 or domain structure 102 as shown in (a) and (b) in FIG. 9. In the domain structures 101, 102, regions of respective Magnetic Domains (MD in the drawing) are formed by Domain Walls (DW in the drawing) indicated by dashed lines. Each magnetic domain is magnetized in a direction of arrow M shown in the drawing, and the domain structures 101, 102 both are closure domain structures being stable states in terms of energy. In the domain structure 101 the number of magnetic domains in the lower magnetic shield layer 21 is 4, and is smaller than the number of magnetic domains in the domain structure 102 in which the number of magnetic domains is 7. Therefore, the domain structure 101 has the domain wall energy smaller than that of the domain structure 102. For this reason, the domain structure 101 is stabler in terms of energy than the domain structure 102.

Since the domain structure 101 and the domain structure 102 have their respective levels of magnetic energy close to each other, a transition readily occurs between the domain structure 101 and the domain structure 102 by virtue of an external impact, a change of an external magnetic field, or the like. Movement of domain walls due to the transition between the domain structures varies the magnetization direction of the magnetic domain in the part where the MR element 22 is stacked in each shield layer 21, 23, to induce fluctuation of the magnetization direction of the free layer in the MR element 22 to cause irregular variation thereof, which results in occurrence of the Barkhausen noise in a reproduction signal in the reproducing head portion 20.

Figure 10:
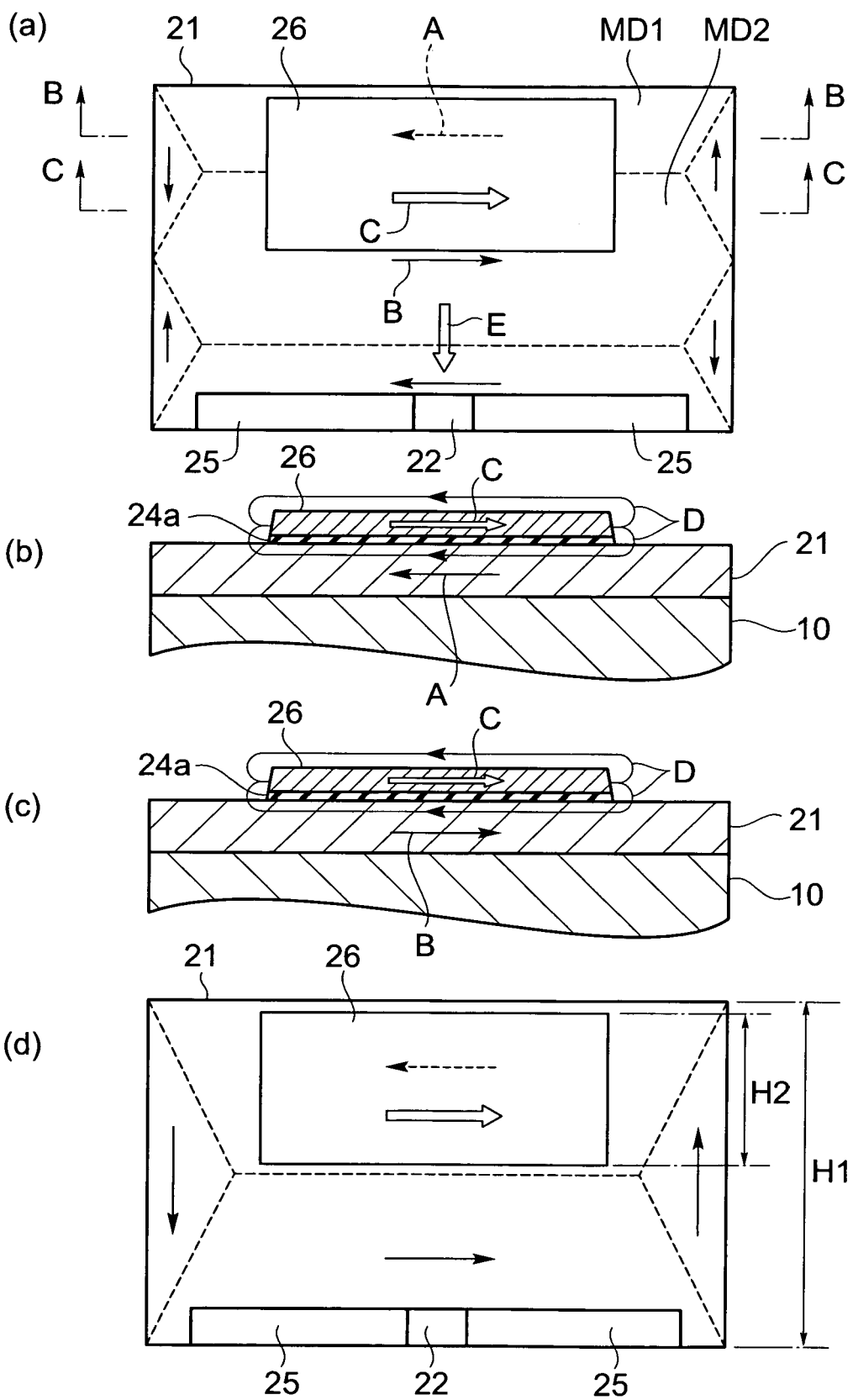
FIG. 10 is a drawing for explaining the transition of the domain structure in the magnetic shield layers.

In the thin film magnetic head 1 of the present invention, the hard magnetic layer 26 of rectangular shape is arranged on the end face A2 side of the lower magnetic shield layer 21, in order to suppress the transition between the domain structures 101, 102 to reduce the Barkhausen noise. A method of suppressing the transition between the domain structures by the hard magnetic layer 26 will be described below with reference to FIG. 10. FIG. 10 is an illustration for explaining the transition between the domain structures in the magnetic shield layers. It is noted that the upper magnetic shield 23 and others are omitted in part in (a)-(d) of FIG. 10.

Supposing the lower magnetic shield 21 is in the closure domain structure with the number of magnetic domains being 7 as in the domain structure 102, as shown in (a) of FIG. 10, the magnetization direction in the magnetic domain MD1 is, for example, the direction of arrow A, and the magnetization direction in the magnetic domain MD2 the direction of arrow B opposite to the direction of arrow A. On the other hand, the hard magnetic layer 26 is magnetized so that the magnetization direction inside it is uniformly aligned, for example, in the direction of arrow C. A static magnetic field is generated around the hard magnetic layer 26 and the static magnetic field is directed in the direction of arrow D shown in (b) and (c) of FIG. 10, particularly, in the spaces above and below the hard magnetic layer 26.

In the magnetic domain MD1, therefore, the magnetization direction of the magnetic domain MD1 (the direction of arrow A) is the same as the direction of the static magnetic field (the direction of arrow D) by the hard magnetic layer 26, as shown in (b) of FIG. 10. This results in inducing static magnetic coupling between the magnetic domain MD1 in the lower shield layer 21 and the hard magnetic layer 26, and this state in the magnetic domain MD1 is advantageous in terms of magnetic energy, so that the region of the magnetic domain MD1 becomes likely to move and expand in the direction of arrow E. On the other hand, in the magnetic domain MD2, the magnetization direction of the magnetic domain MD2 (the direction of arrow B) is opposite to the direction of the static magnetic field (the direction of arrow D) by the hard magnetic layer 26, as shown in (c) of FIG. 10, and this state in the magnetic domain MD2 is disadvantageous in terms of magnetic energy, so that the region of the magnetic domain MD2 is likely to move and contract in the direction of arrow E. In the case where the domain structure of the lower shield layer 21 was the 7-domain structure shown in (a) of FIG. 10, each magnetic domain of the lower shield layer 21 moves with action of the static magnetic field generated around the hard magnetic layer 26, on the lower magnetic shield layer 21, whereby the domain structure of the lower shield layer 21 is likely to make a transition into the 4-domain structure shown in (d) of FIG. 10.

Since the first embodiment adopts the configuration wherein the hard magnetic layer 26 is located on the end face A2 side and wherein the height H2 of the hard magnetic layer 26 is larger than ⅓ and smaller than ½ of the height H1 of the lower magnetic shield layer, as described above, the static magnetic field of the hard magnetic layer 26 acts on the magnetic domains MD1 and MD2, to permit the lower magnetic shield layer 21 to be maintained in the 4-domain structure (cf. (a) of FIG. 9 and (d) of FIG. 10). If the height H2 of the hard magnetic layer 26 is not more than ⅓ of the height H1 of the lower magnetic shield layer 21, the static magnetic field of the hard magnetic layer 26 will become less likely to act on the plurality of magnetic domains and it will be hard to maintain the lower magnetic shield layer 21 in the 4-domain structure (cf. (b) of FIG. 9). On the other hand, if the height H2 of the hard magnetic layer 26 is not less than ½ of the height H1 of the lower magnetic shield layer 21, the static magnetic field of the hard magnetic layer 26 will act on a wider range of the lower shield layer 21 to distort the magnetic domains in the lower shield layer 21 and the static magnetic field of the hard magnetic layer 26 will tend to act on the free layer of the MR element 22 to degrade readout performance of the reproducing head portion 20 (cf. (c) of FIG. 9).

We conducted a test for confirming the reduction of the Barkhausen noise in the thin film magnetic head 1 according to the present invention. The test is to prepare wafers in each of which a plurality of thin film magnetic heads 1 are formed according to each type, in respective configurations of Example 1, Comparative Example 1, and Comparative Example 2 described below, to measure a change of magnetoresistance of MR element 22 against an external magnetic field for each thin film magnetic head 1 formed in each of the wafers by means of QST (Quansi Static Tester), and to obtain magnetoresistance curves (R-H curves). Then an index to indicate how easily the magnetization direction of the free layer in each MR element 22 is fluctuated (hereinafter referred to as FF (Fluctuation Factor) value) is obtained for each wafer from the magnetoresistance curves obtained for the respective thin film magnetic heads 1 in the same wafer. Namely, as this FF value becomes larger, the magnetization direction of the free layer in the thin film magnetic head 1 in that wafer becomes more likely to irregularly vary with external influence. Therefore, the wafer has the thin film magnetic heads 1 easily producing the Barkhausen noise and thus can be said to be unstable. In this manner, the FF value is determined for each of the wafers in which the thin film magnetic heads 1 of Example 1, Comparative Example 1, and Comparative Example 2 are formed. One thin film magnetic head 1 is selected out of the plurality of thin film magnetic heads 1 formed in each wafer, and the MR ratio of the thin film magnetic head 1 is determined. This MR ratio represents a change rate of magnetoresistance according to change of an external magnetic field. As the MR ratio increases, the sensitivity of the thin film magnetic head 1 to read magnetic information of the hard disk becomes higher.

EXAMPLE 1

In Example 1, the base 10 was formed by depositing the ground layer of $Al_2O_3$ on the substrate of $Al_2O_3.TiC$, and thereafter the magnetic shield layers 21, 23, MR layer 22, bias-applying layers 25, and hard magnetic layer 26 were formed according to the aforementioned production method of the thin film magnetic head 1. The magnetic shield layers 21, 23 were made of NiFe and had the width W1 of 90 µm the height H1 of 25 µm, and the thickness T of 2.0 µm. The bias-applying layers 25 were made of CoCrPt and had the width X of 14 µm and the depth Y of 3.5 µm. The hard magnetic layer 26 was made of CoCrPt and had the width W2 of 50 µm and the height H2 of 10 µm.

COMPARATIVE EXAMPLE 1

Comparative Example 1 is different from Example 1 in that the hard magnetic layer 26 was not provided and in that the depth Y of the bias-applying layers 25 was 3.5 µm.

COMPARATIVE EXAMPLE 2

Comparative Example 2 is different from Example 1 in that the hard magnetic layer 26 was not provided and in that the depth Y of the bias-applying layers 25 was 6 µm.

In each of Example 1, Comparative Example 1, and Comparative Example 2, the test was conducted using two types of samples in which the thickness Z in the stack direction of the bias-applying layers 25 was 1.75 μm and 2.5 μm, respectively.

Figure 11:
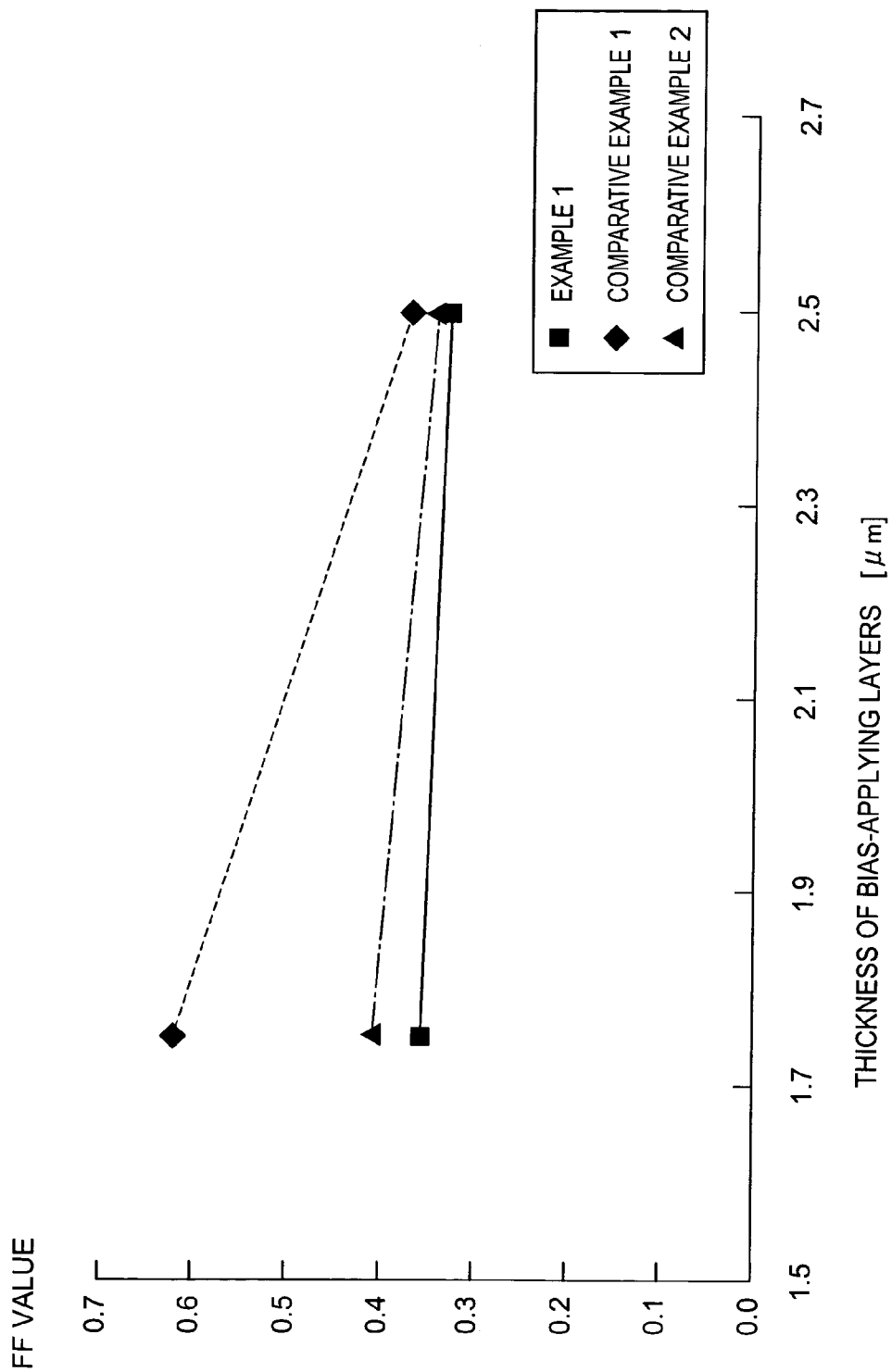
FIG. 11 is a drawing showing correspondence relations between thicknesses of bias-applying layers and FF values obtained in Example 1, Comparative Example 1, and Comparative Example 2.
Figure 12:
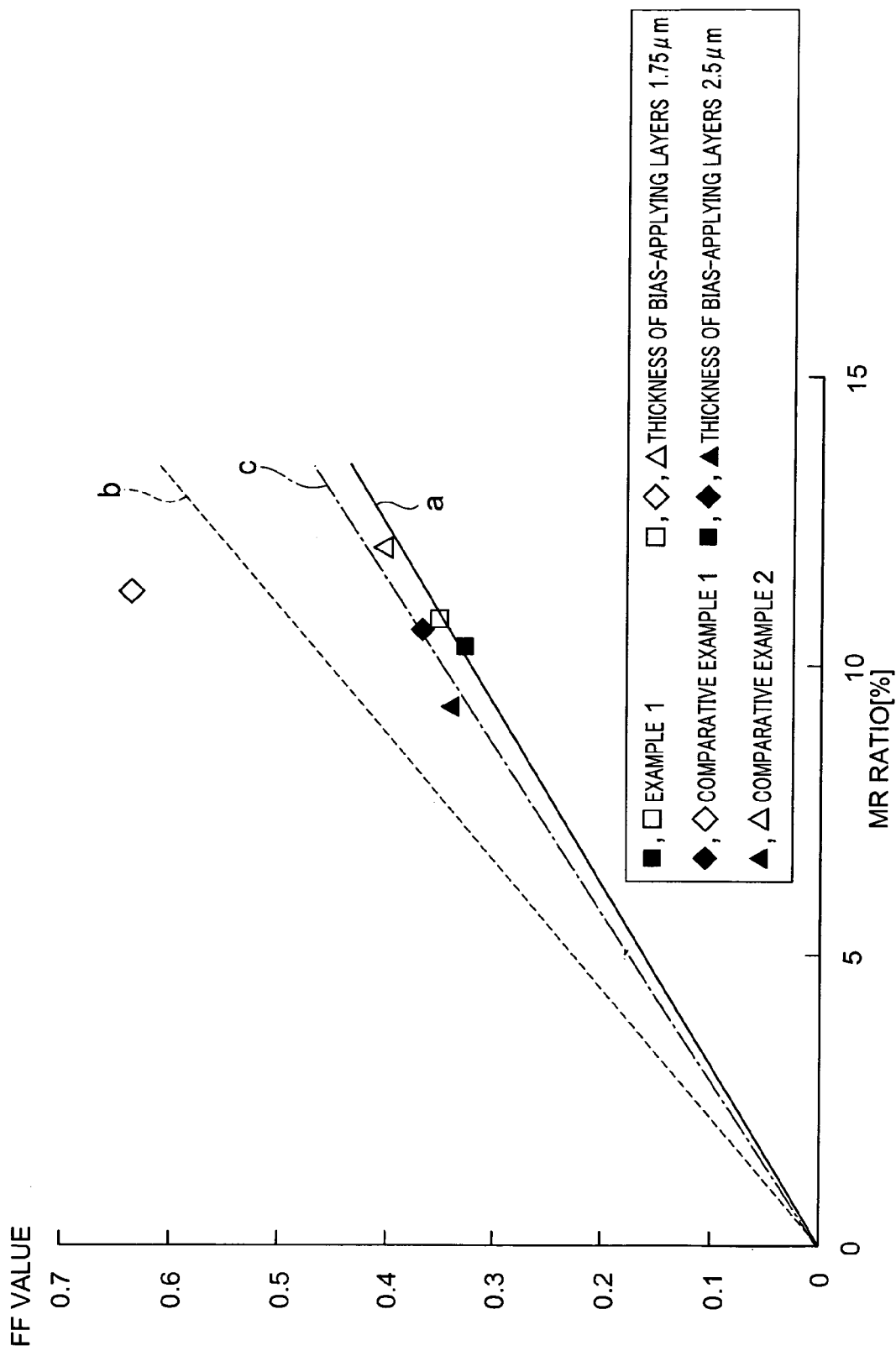
FIG. 12 is a drawing showing correspondence relations between MR ratios and FF values obtained in Example 1, Comparative Example 1, and Comparative Example 2.

The fact that the thin film magnetic head 1 according to the present invention effectively reduces the Barkhausen noise will be described with reference to FIGS. 11 and 12, based on the results of the above test. FIG. 11 is a drawing showing correspondence relations between thicknesses of the bias-applying layers and FF values obtained in Example 1, Comparative Example 1, and Comparative Example 2. FIG. 12 is a drawing showing correspondence relations between MR ratios and FF values obtained in Example 1, Comparative Example 1, and Comparative Example 2.

As seen from FIG. 11, the FF value decreases with increase in the thickness Z of the bias-applying layers 25 in all of Example 1, Comparative Example 1, and Comparative Example 2. This is because the increase in the thickness Z of the bias-applying layers 25 increases the strength of the bias magnetic field applied to the MR element 22 so as to make the free layer in the MR element 22 less likely to be fluctuated. The FF value in Comparative Example 2 is smaller than the FF value in Comparative Example 1, regardless of the thickness of the bias-applying layers 25. This is because the area of the bias-applying layers 25 (a product of the width X and depth Y of the bias-applying layers) in Comparative Example 2 is larger than the area of the bias-applying layers 25 in Comparative Example 1 and thus the free layer in the MR element 22 is less likely to be fluctuated, as in the above case. Furthermore, the FF value in Example 1 is smaller than that in Comparative Example 2, regardless of the thickness of the bias-applying layers 25. Therefore, it was confirmed by Example 1 according to the present invention that the hard magnetic layer 26 maintained the domain structure of the lower shield layer 21 and the upper shield layer 23 in the 4-domain structure and was effective in reduction of the Barkhausen noise.

If an infinitely strong bias magnetic field is applied to the free layer of the MR element 22, the magnetization direction of the free layer will not be varied at all by an external magnetic field, and thus the MR ratio and FF value both will be 0. Based on this, approximate lines of Example 1, Comparative Example 1, and Comparative Example 2 are determined with the intercept of 0 in FIG. 12, thereby obtaining lines a, b, and c, respectively. When comparison is made among slopes of the respective lines a, b, and c, the slope of the line a in Example 1 is smaller than the slope of the line b in Comparative Example 1 and the slope of the line c in Comparative Example 2. For this reason, the FF value of the wafer for the thin film magnetic head 1 in Example 1 indicating a certain MR ratio is the smallest, as compared with the FF values of the wafers for the thin film magnetic heads 1 in Comparative Example 1 and Comparative Example 2 indicating the same MR ratio. Therefore, it was confirmed that Example 1 according to the present invention, where the thin film magnetic heads 1 were produced with the same MR ratio as those in Comparative Example 1 and Comparative Example 2, was effective in the reduction of the Barkhausen noise while maintaining the readout sensitivity of the thin film magnetic heads.

In the first embodiment, as described above, the hard magnetic layer 26 is located between the lower magnetic shield layer 21 and the upper magnetic shield layer 23 and arranged on the end face A2 side of each magnetic shield layer 21, 23, and the height H2 of the hard magnetic layer 26 is larger than ⅓ and smaller than ½ of the height H1 of each magnetic shield layer 21, 23. For this reason, it becomes easier to maintain the domain structure of each magnetic shield layer 21, 23 as the 4-domain structure and it is thus feasible to suppress the transition between the domain structures in each magnetic shield layer 21, 23 and to stabilize the domain structure. In consequence, it becomes feasible to achieve adequate reduction of the Barkhausen noise. Since the MR element 22 is located on the end face A1 side and the hard magnetic layer 26 on the end face A2 side opposite to the end face A1, the magnetization direction of the free layer in the MR element 22 is less likely to be affected by the static magnetic field generated from the hard magnetic layer 26.

In the first embodiment, the hard magnetic layer 26 is rectangular, the width W2 of the hard magnetic layer 26 is larger than the height H2, and the direction of the width W2 of the hard magnetic layer 26 is along the direction of the width W1 of each magnetic shield layer 21, 23. Furthermore, the width W1 of each magnetic shield layer 21, 23 is larger than the height H1. In consequence, it is easier to maintain the domain structure of each magnetic shield layer 21, 23 as the 4-domain structure.

In the first embodiment the magnetization direction of the bias-applying layers 25 is the same as the magnetization direction of the hard magnetic layer 26, and thus they can be magnetized by a single step.

Second Embodiment

Figure 13:
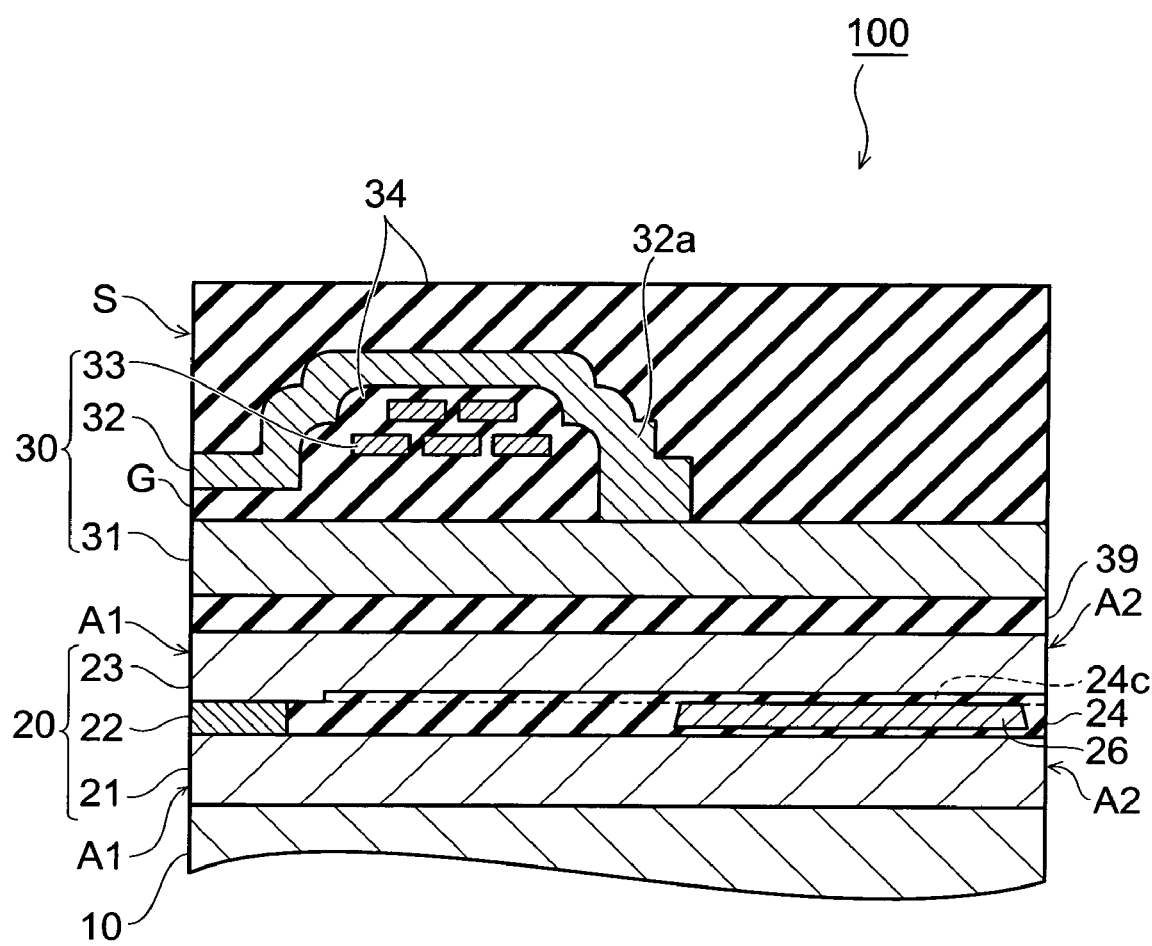
FIG. 13 is a schematic sectional view of a thin film magnetic head taken along a direction normal to a medium-facing surface of the thin film magnetic head according to the second embodiment and viewed from a track width direction.
Figure 14:
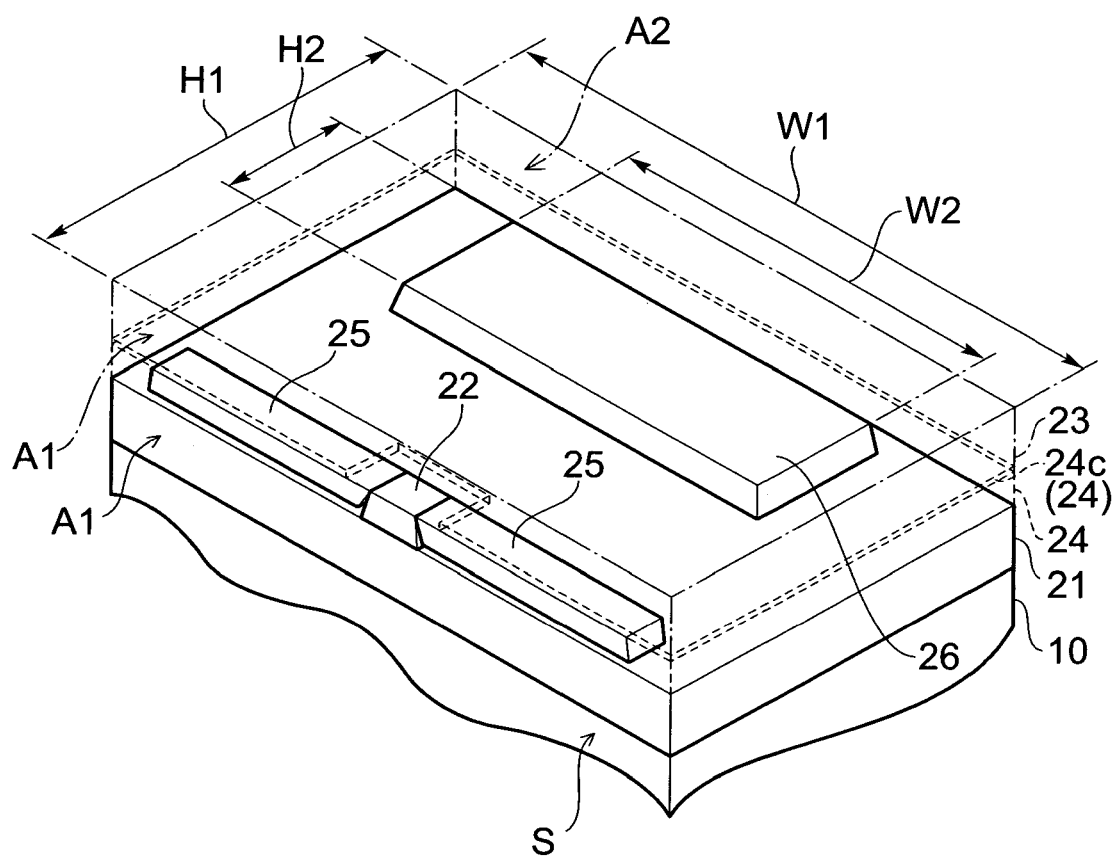
FIG. 14 is a perspective view showing a part of the thin film magnetic head according to the second embodiment.

Next, a configuration of thin film magnetic head 100 according to the second embodiment will be described with reference to FIGS. 13 and 14. FIG. 13 is a schematic sectional view of the thin film magnetic head taken along a direction normal to the medium-facing surface of the thin film magnetic head according to the second embodiment and viewed from the track width direction. FIG. 14 is a perspective view showing a part of the thin film magnetic head according to the second embodiment. The thin film magnetic head 100 of the second embodiment is different from the thin film magnetic head 1 of the first embodiment in that the thin film magnetic head 100 further comprises an insulating film 24c. The thin film magnetic head 100 of the second embodiment will be described below with focus on the difference, without redundant description.

The insulating film 24c is formed so as not to cover the top surface of the MR element 22 and so as to cover the top surface of the hard magnetic layer 26, as shown in FIGS. 13 and 14. Namely, the insulating film 24c is formed so as not to impede conduction of an electric current between the magnetic shield layers 21, 23 through the MR element 22.

Figure 15:
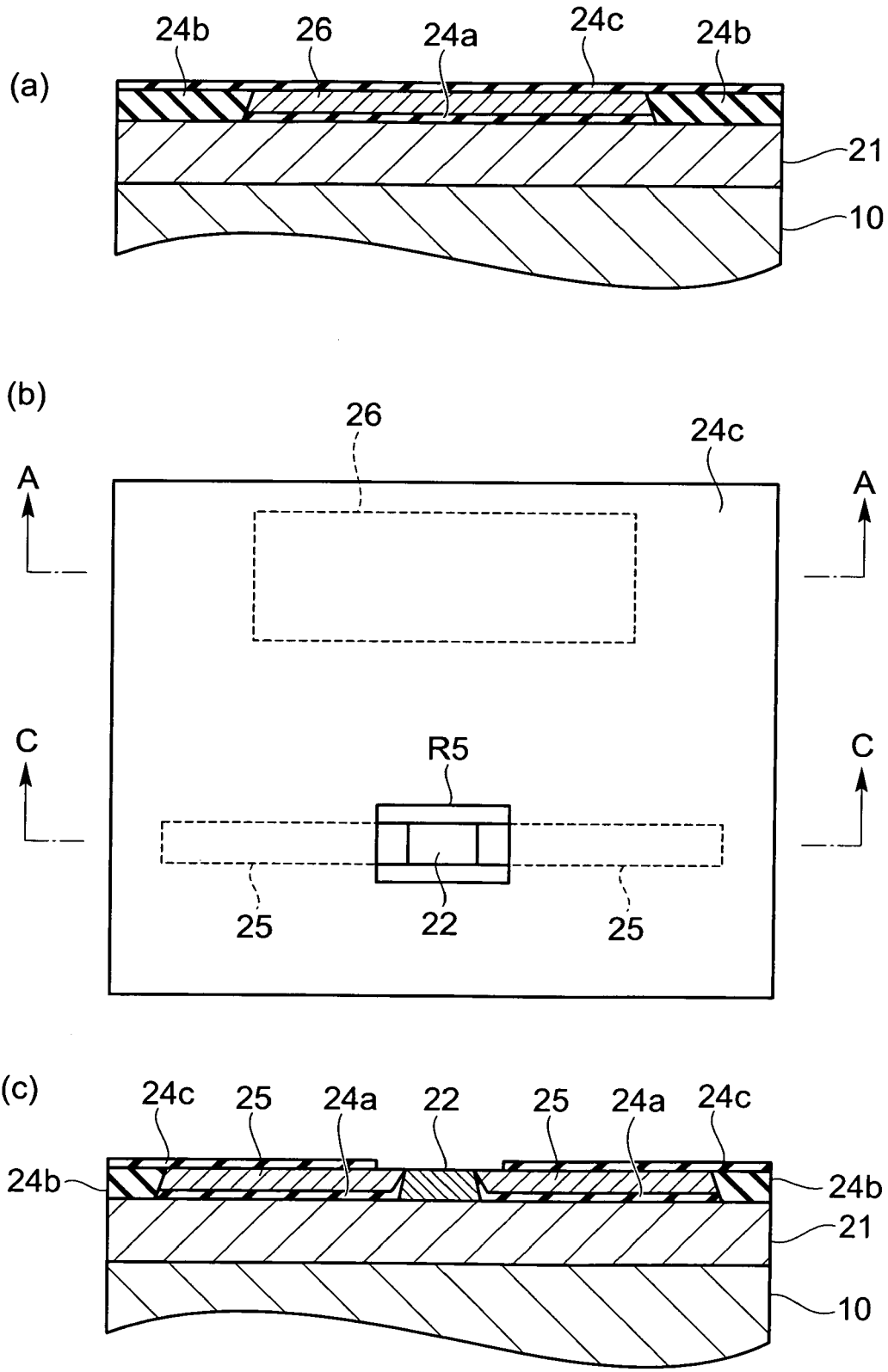
FIG. 15 is a drawing including (a) and (c) sectional views along direction A-A and along direction C-C, respectively, in (b) showing a step in a production process of the reproducing head portion according to the second embodiment, and (b) a plan view showing the step in the production process of the reproducing head portion according to the second embodiment.
Figure 16:
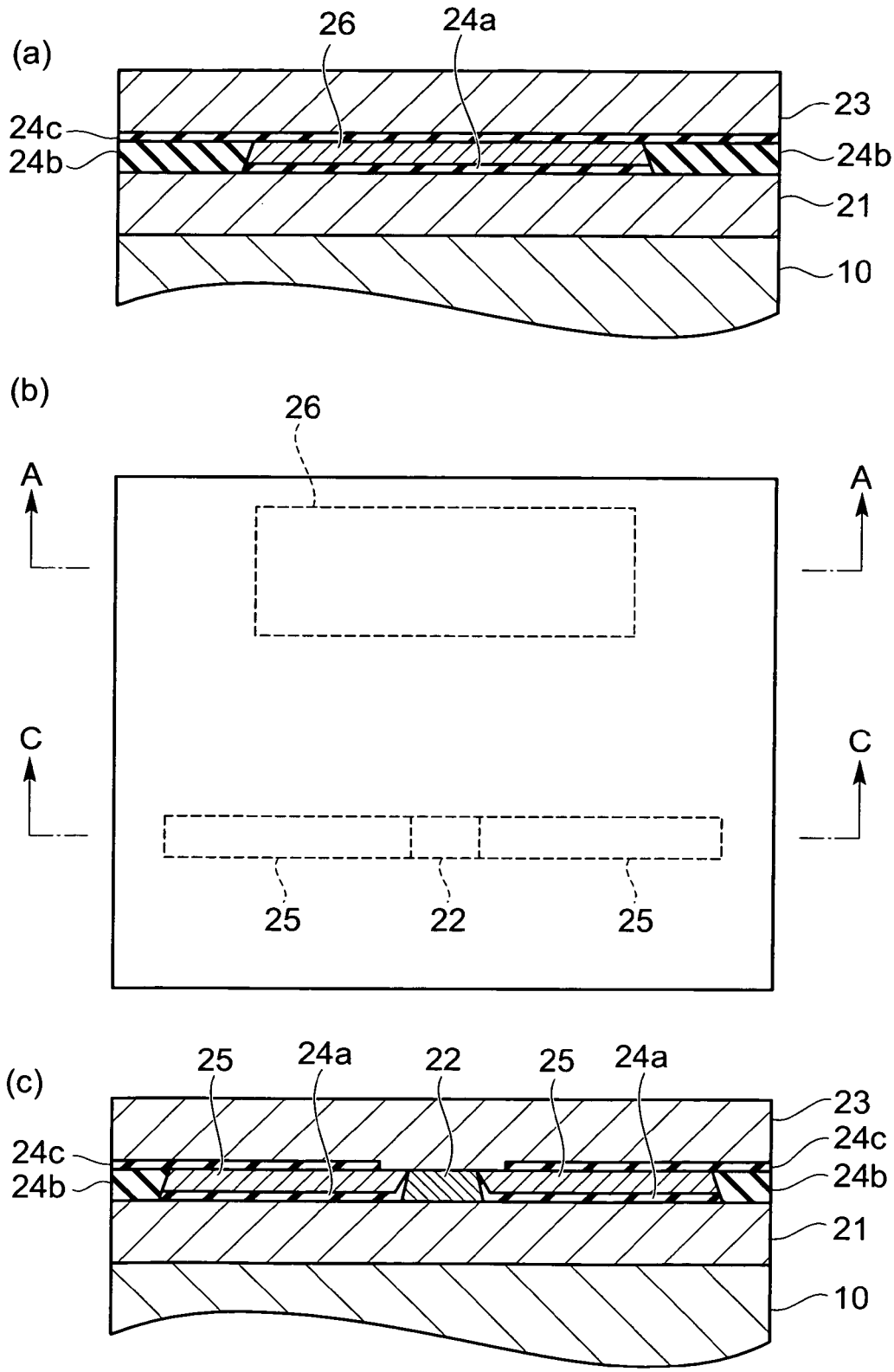
FIG. 16 is a drawing including (a) and (c) sectional views along direction A-A and along direction C-C, respectively, in (b) showing a subsequent step to FIG. 15, and (b) a plan view showing the subsequent step to FIG. 15.

Next, a production method of reproducing head portion 20 forming the thin film magnetic head 1 of the second embodiment will be described with reference to FIGS. 15 and 16. FIG. 15 includes (a) and (c) sectional views along direction A-A and along direction C-C, respectively, in (b) showing a part of the production process of the reproducing head portion according to the second embodiment, and (b) a plan view showing a part of the production process of the reproducing head portion according to the second embodiment. FIG. 16 includes (a) and (c) sectional views along direction A-A and along direction C-C, respectively, in (b) showing a subsequent step to FIG. 15, and (b) a plan view showing the subsequent step to FIG. 15.

The production method of the thin film magnetic head 100 according to the second embodiment is the same as the production method of the thin film magnetic head 1, up to the steps of forming the resist film 27 (cf. FIG. 6), removing the exposed surface regions by ion milling or the like down to the surface of the lower magnetic shield layer 21 with the resist film 27 as a mask, forming the insulating film 24b over the entire surface of the intermediate body, and thereafter removing the resist film 27 to effect liftoff.

In the subsequent step, after the liftoff by removal of the resist film 27, an unrepresented resist film is formed in a region R5 (cf. FIG. 15) of an approximately rectangular shape to cover the MR element 22 and the neighborhood of the MR element 22. This resist film is formed by applying a resist material, which polymerizes with irradiation of light or an electron beam, onto the surface of the intermediate body, exposing the resist material to light or an electron beam, and thereafter developing it. In a state in which the resist film is left, an insulating film 24c of a nonmagnetic insulating material is then deposited in the region other than the region R5 by sputtering or the like. Furthermore, the resist film is removed to effect liftoff, thereby removing the deposited material on the resist film. This results in forming the insulating film 24c in the region other than the region R5.

Subsequently, the upper magnetic shield layer 23 is deposited over the entire surface of the intermediate body of the reproducing head portion 20 obtained as described above (cf. FIG. 16). The reproducing head portion 20 according to the second embodiment is obtained in this manner.

As described above, the second embodiment also adopts the configuration wherein the hard magnetic layer 26 is located between the lower magnetic shield layer 21 and the upper magnetic shield layer 23 and arranged on the end face A2 side of each magnetic shield layer 21, 23 and wherein the height H2 of the hard magnetic layer 26 is larger than ⅓ and smaller than ½ of the height H1 of each magnetic shield layer 21, 23. For this reason, the thin film magnetic head 100 of the second embodiment also has the same operational effect as the aforementioned thin film magnetic head 1 of the first embodiment. Since the thin film magnetic head 100 of the second embodiment is provided with the insulating film 24a, the magnetic shield layers 21, 23 are electrically isolated from each other. Furthermore, since the thin film magnetic head 100 of the second embodiment is provided with the insulating film 24c, the insulating film 24c functions as a separator to secure the distance between the magnetic shield layers 21, 23, so as to reduce the capacitance between the magnetic shield layers 21, 23.

Third Embodiment

Figure 17:
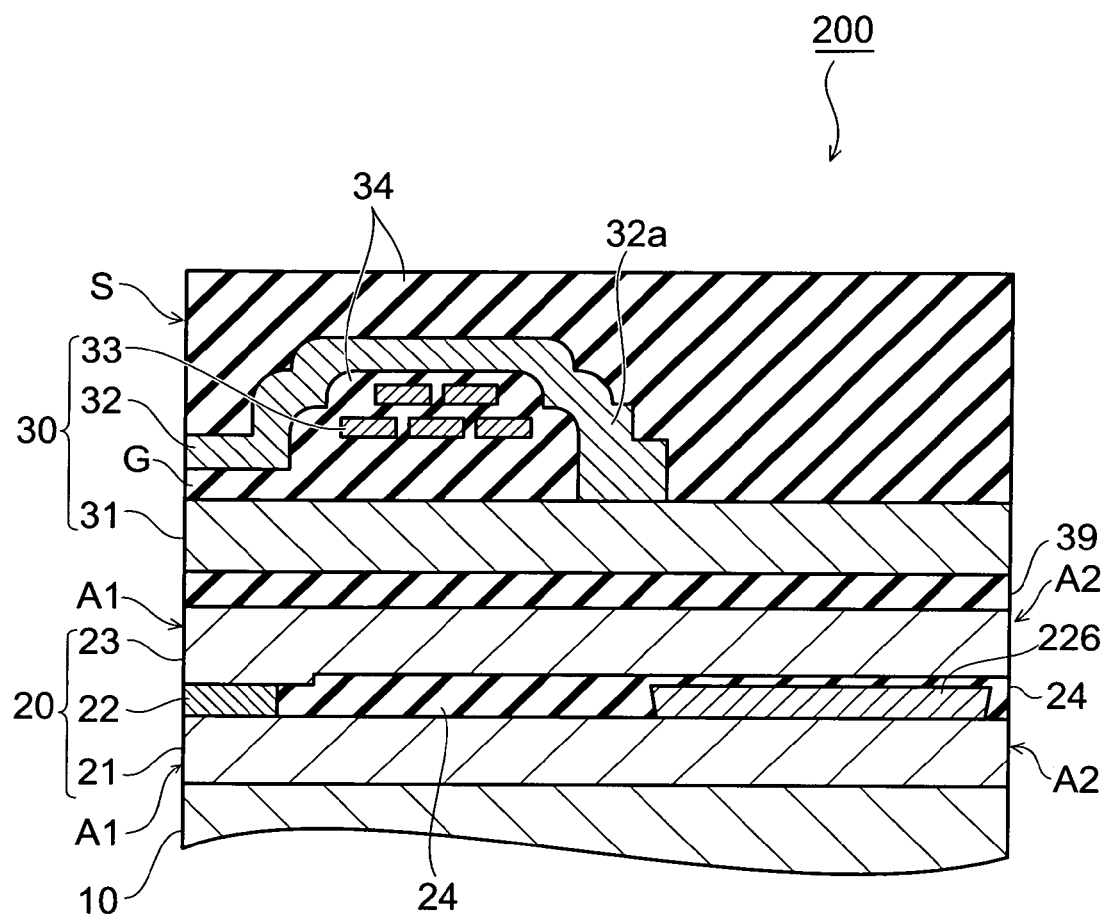
FIG. 17 is a schematic sectional view of a thin film magnetic head taken along a direction normal to a medium-facing surface of the thin film magnetic head according to the third embodiment and viewed from a track width direction.
Figure 18:
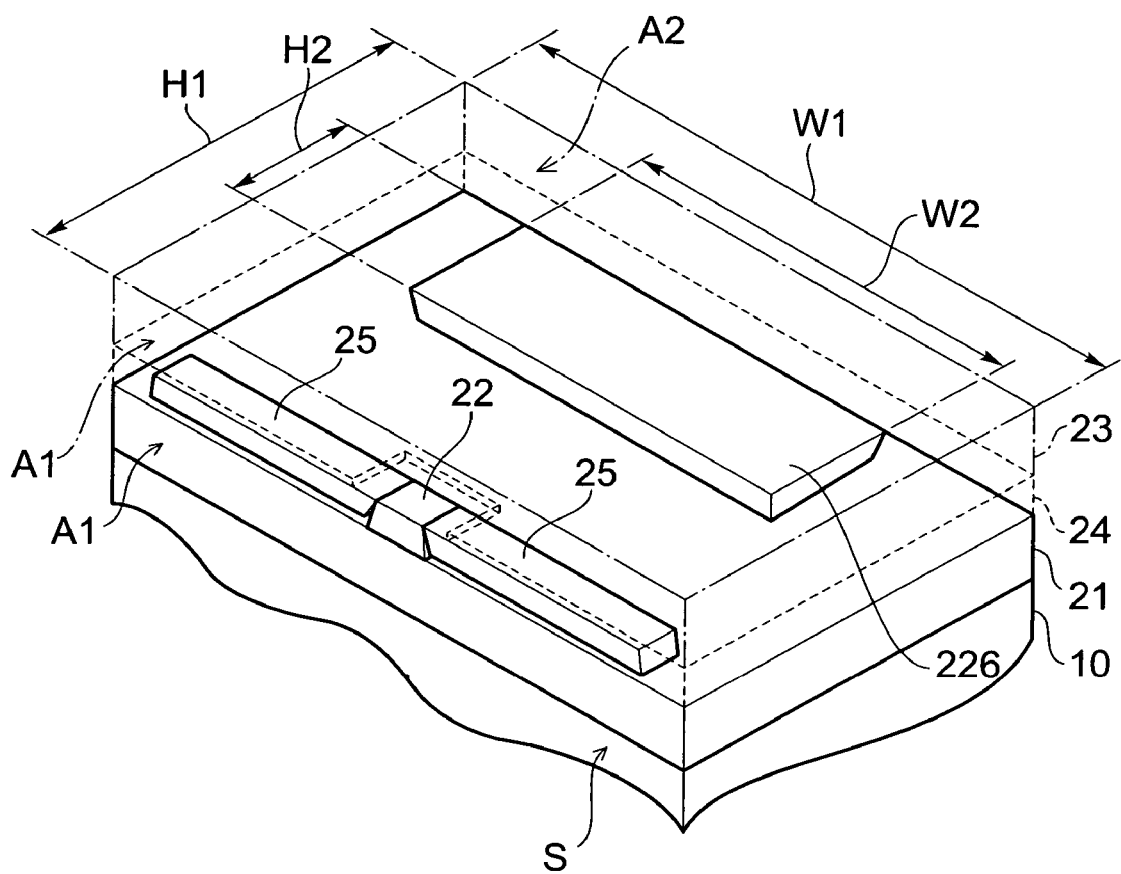
FIG. 18 is a perspective view showing a part of the thin film magnetic head according to the third embodiment.
Figure 19:
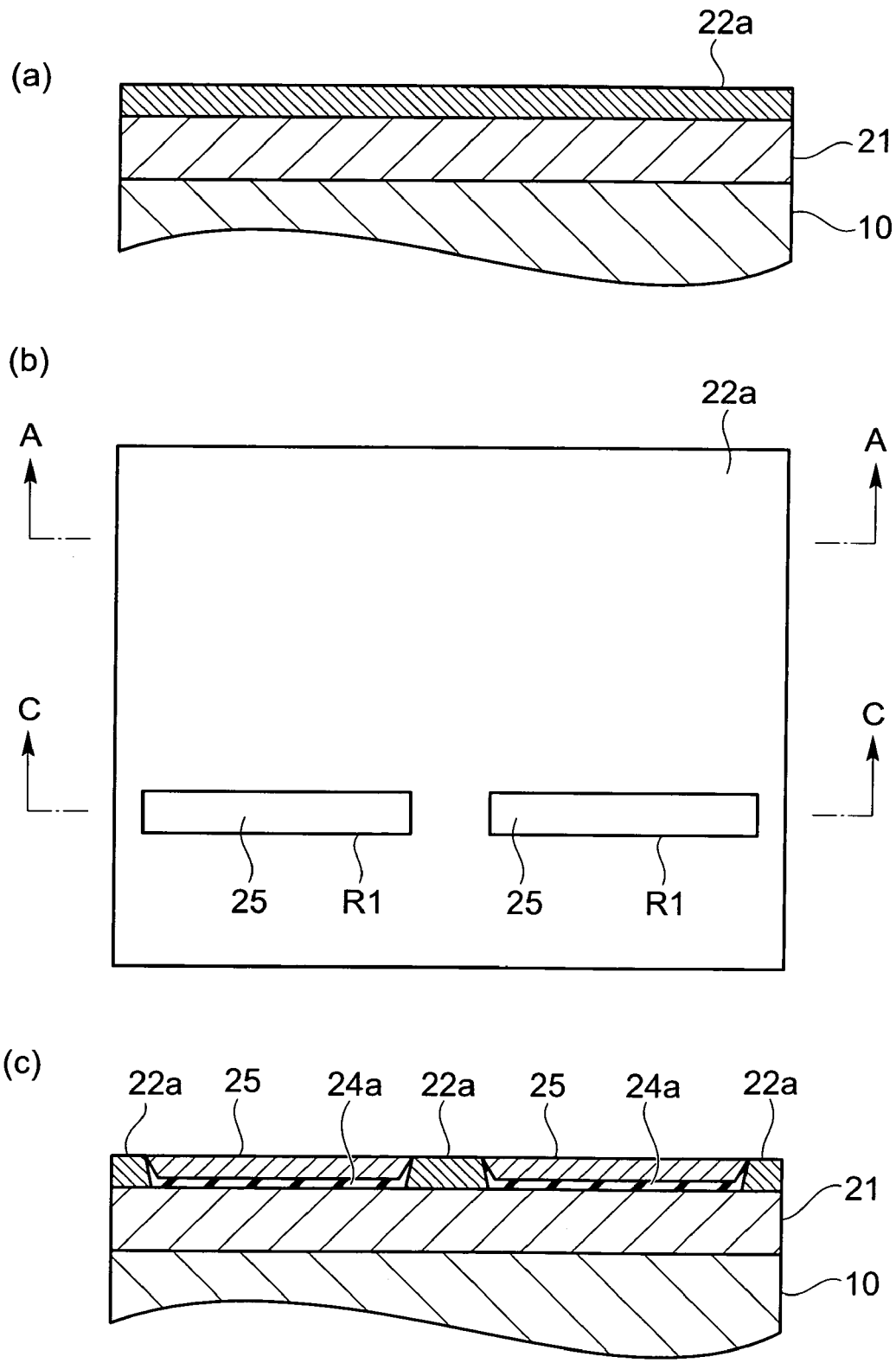
FIG. 19 is a drawing including (a) and (c) sectional views along direction A-A and along direction C-C, respectively, in (b) showing a step in a production process of the reproducing head portion according to the third embodiment, and (b) a plan view showing the step in the production process of the reproducing head portion according to the third embodiment.

Next, a configuration of thin film magnetic head 200 according to the third embodiment will be described with reference to FIGS. 17 and 18. FIG. 17 is a schematic sectional view of the thin film magnetic head taken along a direction normal to the medium-facing surface of the thin film magnetic head according to the third embodiment and viewed from the track width direction. FIG. 18 is a perspective view showing a part of the thin film magnetic head according to the third embodiment. The thin film magnetic head 200 of the third embodiment is mainly different from the above-described embodiments in that an antiferromagnetic layer 226 is formed instead of the hard magnetic layer. The thin film magnetic head 200 of the third embodiment will be described below with focus on the difference, without redundant description.

The antiferromagnetic layer 226 is made of an antiferromagnetic material, for example, such as IrMn, PtMn, FeMn, NiMn, or PtPdMn. The antiferromagnetic layer 226 is provided so as to contact the lower magnetic shield layer 21. In order to establish insulation between the lower magnetic shield layer 21 and the upper magnetic shield layer 23, the antiferromagnetic layer 226 is provided so as to sandwich after-described insulating film 24c between the antiferromagnetic layer 226 and the upper magnetic shield layer 23. The antiferromagnetic layer 226 is of an approximately rectangular shape, when viewed from the stack direction, and is arranged on the end face A2 side of each magnetic shield layer 21, 23. Furthermore, the antiferromagnetic layer 226 is arranged so that its longer sides are parallel to the direction along the end faces A1, A2 of each magnetic shield layer 21, 23, when viewed from the stack direction. When viewed from the stack direction, the length H2 of the sides of the antiferromagnetic layer 226 (the height of antiferromagnetic layer 226) in the direction perpendicular to the end face A1 is smaller than the length thereof (the width of antiferromagnetic layer 226) W2 in the direction along the end face A1 and is larger than ⅓ and smaller than ½ of the height H1 of each magnetic shield layer 21, 23. Namely, in the antiferromagnetic layer 226, the width W2 is set, for example, to approximately ½-⅘ of the width W1. The thickness of the antiferromagnetic layer 226 can be set, for example, to approximately 100-500 nm.

Next, a production method of reproducing head portion 20 forming the thin film magnetic head 200 of the third embodiment will be described with reference to FIGS. 19 to 23. Each (a) of FIGS. 19 to 23 is a sectional view along direction A-A in each (b) of FIGS. 19 to 23 showing the production process of the reproducing head portion according to the third embodiment. Each (b) of FIGS. 19 to 23 is a plan view showing the production process of the reproducing head portion according to the third embodiment. Each (c) of FIGS. 19 to 23 is a sectional view along direction C-C in each (b) of FIGS. 19 to 23 showing the production process of the reproducing head portion according to the third embodiment.

The production method of the thin film magnetic head 200 according to the third embodiment is the same as the production method of the thin film magnetic head 1 (cf. FIG. 4), up to the steps of forming the lower shield layer 21 and MR layer 22a on the base 10.

In the subsequent step, an unrepresented resist film is formed over the MR layer 22a so as to expose two regions R1 (cf. FIG. 19) where the bias-applying layers 25 are to be formed. After this resist film is formed, the surface of the MR film 22a is exposed in the regions R1. Next, using the resist film as a mask, the exposed regions R1 are removed from the surface of the MR film 22a down to the surface of the lower magnetic shield layer 21 by ion milling or the like.

Subsequently, in a state in which the resist film is left, an insulating film 24a of a nonmagnetic insulating material is deposited in the regions R1 by sputtering or the like. Subsequently, a hard magnetic material is deposited over the insulating film 24a to form the bias-applying layers 25 in the regions R1. Then the resist film is removed to effect liftoff, thereby removing the deposited materials on the resist film.

Subsequently, a resist film 227 is formed in a region R3 to cover the two bias-applying layers 25 located on the surface (cf. FIG. 20). For leaving the MR layer 22a only in the predetermined portion to form the MR element 22, the resist film 227 is formed in the region R3 so as to lie across and over the two regions R1. This step determines the length of the MR element 22 (the height of MR element 22) in the direction normal to the air bearing surface S. Next, using the resist film 227 as a mask, the exposed surface region is removed down to the surface of the lower magnetic shield layer 21 by ion milling or the like. Then an insulating film 24b of a nonmagnetic insulating material is formed over the entire surface of the intermediate body in a state in which the resist film 227 is left. Thereafter, the resist film 227 is removed to effect liftoff, thereby removing the deposited material on the resist film 227.

Figure 21:
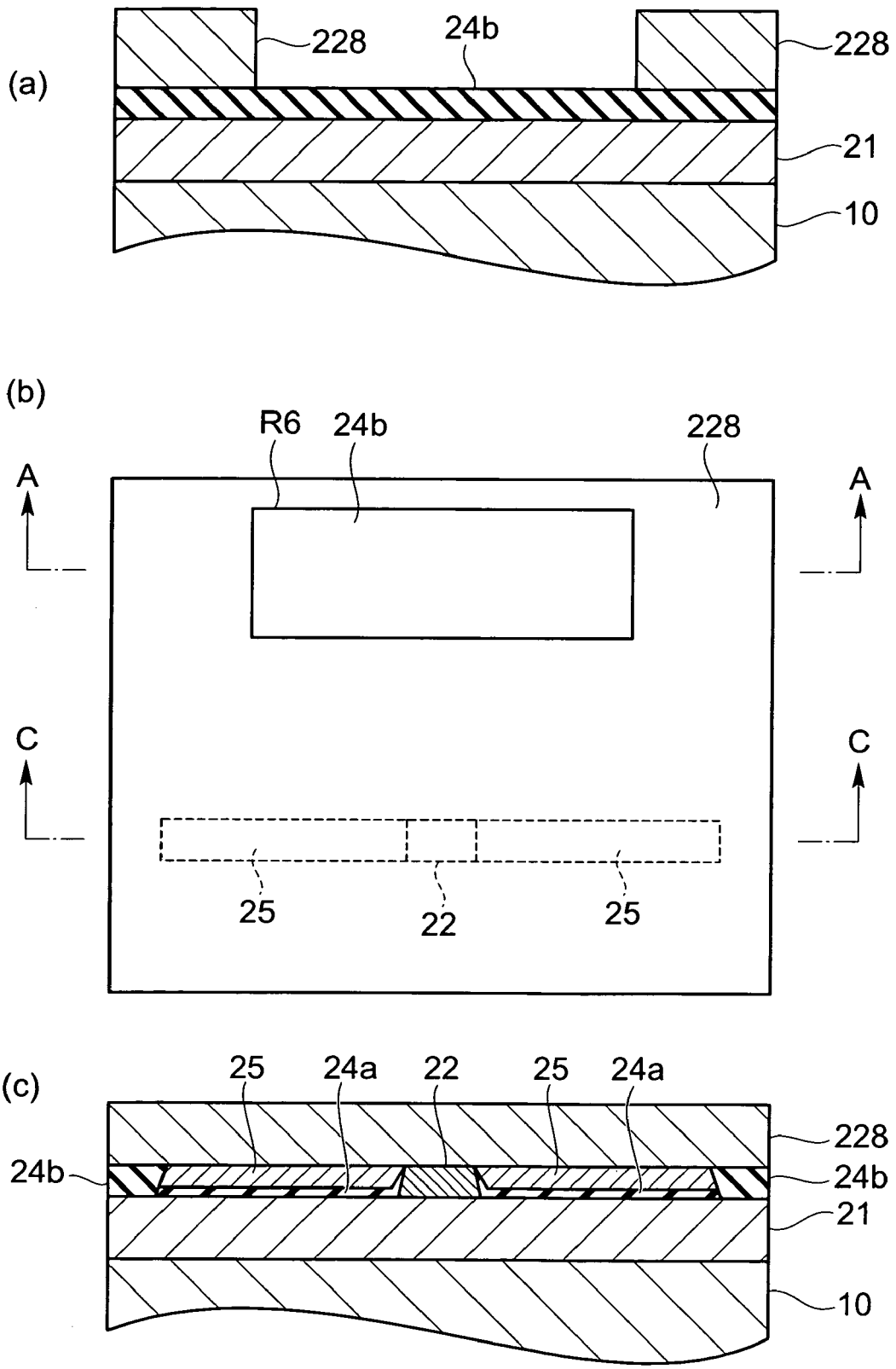
FIG. 21 is a drawing including (a) and (c) sectional views along direction A-A and along direction C-C, respectively, in (b) showing a subsequent step to FIG. 20, and (b) a plan view showing the subsequent step to FIG. 20.

Subsequently, a resist film 228 is formed over the insulating film 24b so a to expose a region R6 where the antiferromagnetic layer 226 is to be formed (cf. FIG. 21). This step determines the location and size of the antiferromagnetic layer 226. Next, using the resist film 228 as a mask, the exposed surface region R6 is removed down to the lower magnetic shield layer 21 by ion milling or the like.

Figure 22:
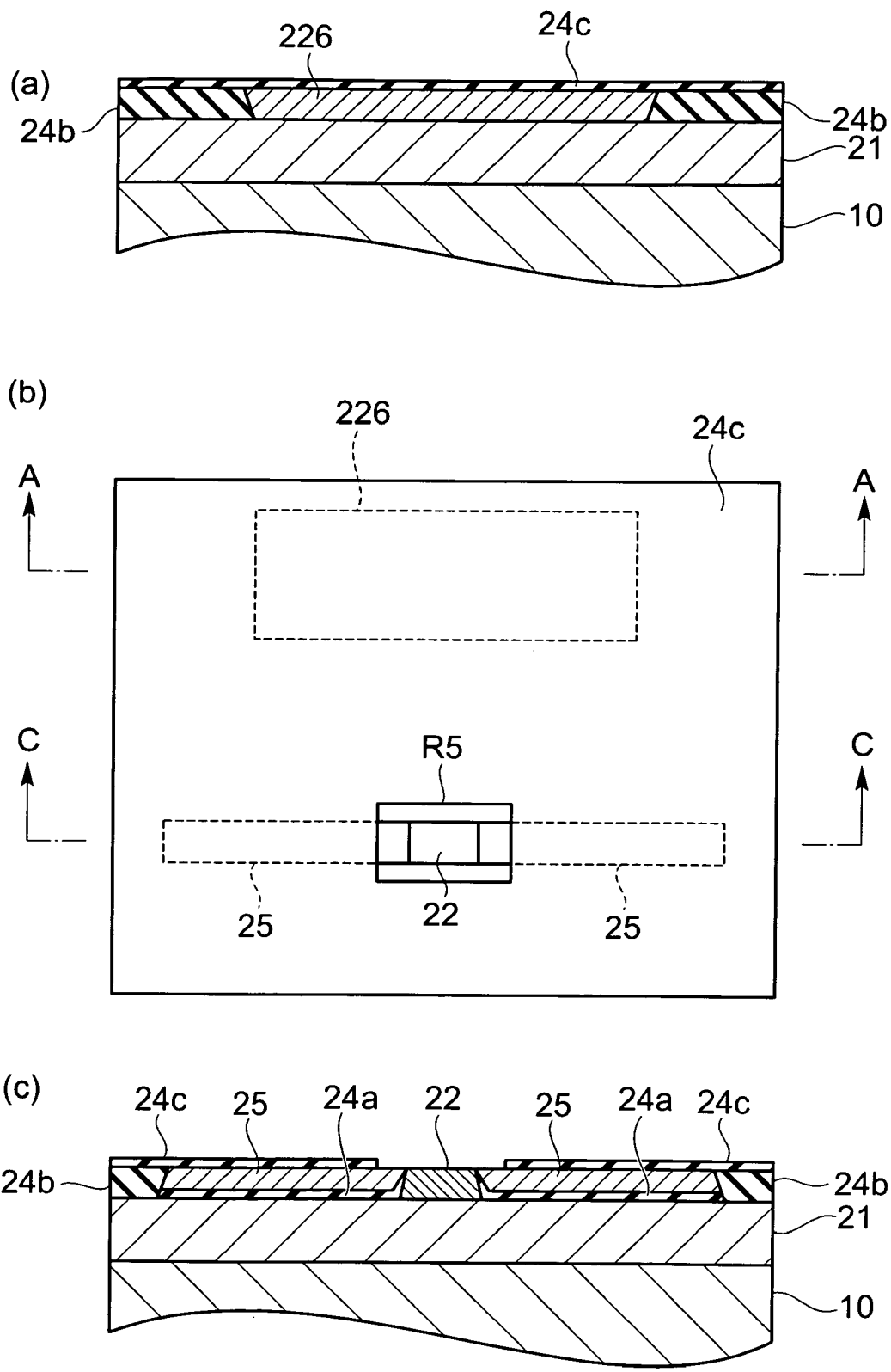
FIG. 22 is a drawing including (a) and (c) sectional views along direction A-A and along direction C-C, respectively, in (b) showing a subsequent step to FIG. 21, and (b) a plan view showing the subsequent step to FIG. 21.

Subsequently, in a state in which the resist film 228 is left, an antiferromagnetic material is deposited in the region R6 by sputtering or the like to form the antiferromagnetic layer 226 in the region R6 (cf. FIG. 22). At this time, in order to provide the lower magnetic shield layer 21 with desired magnetic anisotropy, the antiferromagnetic layer 226 is formed while applying a magnetic field thereto. Then the resist film 228 is removed to effect liftoff, thereby removing the deposited material on the resist film 228.

Subsequently, an unrepresented resist film is formed in a region R5 of an approximately rectangular shape to cover the MR element 22 and the neighborhood of the MR element 22. Then, in a state in which this resist film is left, an insulating film 24c of a nonmagnetic insulating material is deposited in the region other than the region R5 by sputtering or the like. Furthermore, the resist film is removed to effect liftoff, thereby removing the deposited material on the resist film. This results in forming the insulating film 24c in the region other than the region R5.

Figure 23:
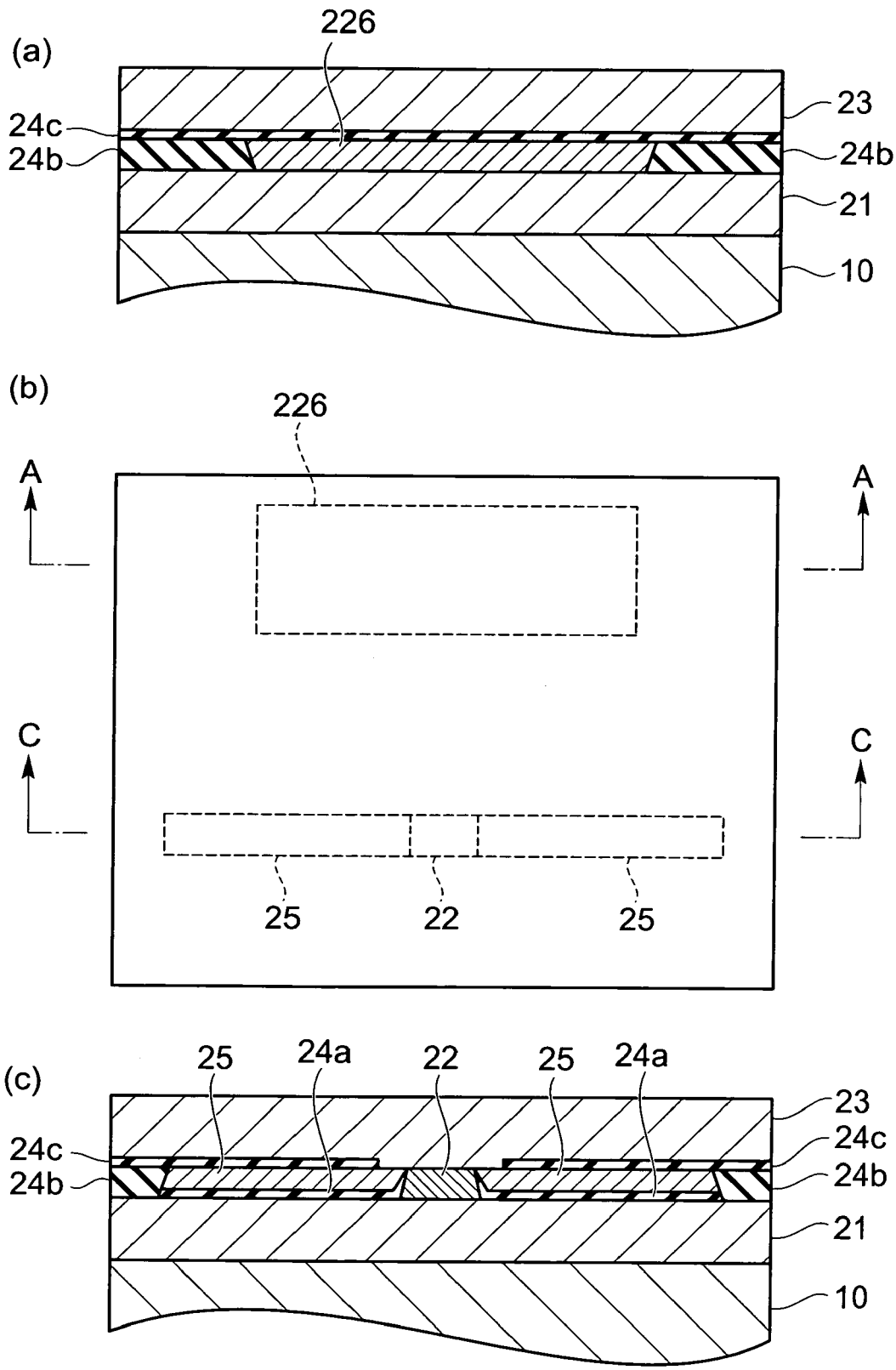
FIG. 23 is a drawing including (a) and (c) sectional views along direction A-A and along direction C-C, respectively, in (b) showing a subsequent step to FIG. 22, and (b) a plan view showing the subsequent step to FIG. 22.

Subsequently, the upper magnetic shield layer 23 is deposited over the entire surface of the intermediate body of the reproducing head portion 20 obtained as described above (cf. FIG. 23). The reproducing head portion 20 of the third embodiment is obtained in this manner.

In the third embodiment, as described above, the antiferromagnetic layer 226 is provided so as to contact the lower magnetic shield layer 21 which is one of the pair of magnetic shield layers 21, 23. The antiferromagnetic layer 226 is arranged on the end face A2 side of each magnetic shield layer 21, 23 and the height H2 of the antiferromagnetic layer 226 is larger than ⅓ and smaller than ½ of the height H1 of each magnetic shield layer 21, 23. For this reason, the direction of magnetization in the region of the lower magnetic shield layer 21 in contact with the antiferromagnetic layer 226 is fixed by exchange interaction between the antiferromagnetic layer 226 and the lower magnetic shield layer 21, whereby it becomes easier to maintain the domain structure of the lower magnetic shield layer 21 as the 4-domain structure as shown in (d) of FIG. 10 and it is feasible to suppress the transition between the domain structures in the lower magnetic shield layer 21 and to stabilize the domain structure. In consequence, it is feasible to achieve adequate reduction of the Barkhausen noise.

In the third embodiment, the antiferromagnetic layer 226 is rectangular, the width W2 of the antiferromagnetic layer 226 is larger than the height H2, and the direction of the width W2 of the antiferromagnetic layer 226 is along the direction of the width W1 of each magnetic shield layer 21, 23. Furthermore, the width W1 of each magnetic shield layer 21, 23 is larger than the height H1. This results in making it easier to maintain the domain structure of each magnetic shield layer 21, 23 as the 4-domain structure.

Fourth Embodiment

Figure 24:
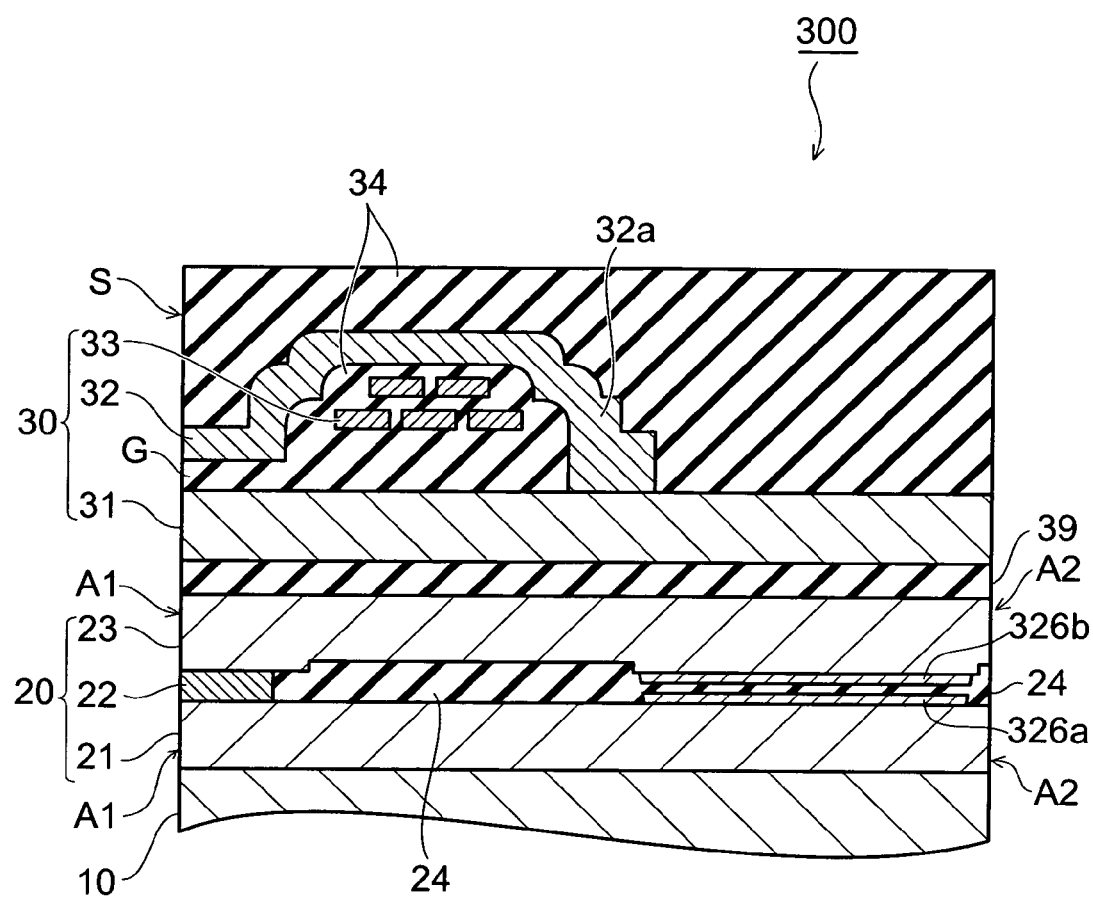
FIG. 24 is a schematic sectional view of a thin film magnetic head taken along a direction normal to a medium-facing surface of the thin film magnetic head according to the fourth embodiment and viewed from a track width direction.
Figure 25:
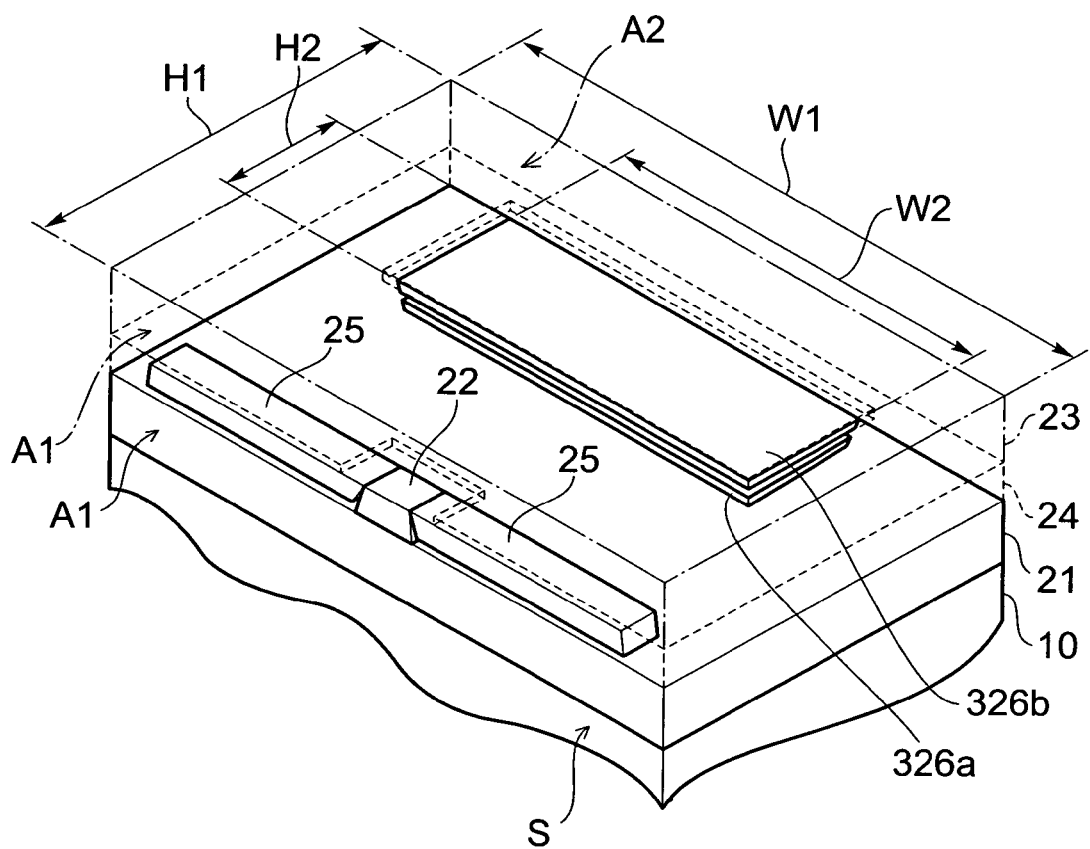
FIG. 25 is a perspective view showing a part of the thin film magnetic head according to the fourth embodiment.

Next, a configuration of thin film magnetic head 300 according to the fourth embodiment will be described with reference to FIGS. 24 and 25. FIG. 24 is a schematic sectional view of the thin film magnetic head taken along a direction normal to the medium-facing surface of the thin film magnetic head of the fourth embodiment and viewed from the track width direction. FIG. 25 is a perspective view showing a part of the thin film magnetic head of the fourth embodiment. The thin film magnetic head 300 of the fourth embodiment is mainly different from the thin film magnetic head 200 of the above-described third embodiment in that there are two layers of antiferromagnetic layers provided. The thin film magnetic head 300 of the fourth embodiment will be described below with focus on the difference, without redundant description.

The antiferromagnetic layers 326a, 326b are made of a material similar to that of the antiferromagnetic layer 226 in the third embodiment. The antiferromagnetic layer 326a is provided so as to contact the lower magnetic shield layer 21, while the antiferromagnetic layer 326b is provided so as to contact the upper magnetic shield layer 23. The antiferromagnetic layers 326a, 326b are provided so as to sandwich after-described insulating film 24d between them, in order to establish insulation between the lower magnetic shield layer 21 and the upper magnetic shield layer 23. The location of the antiferromagnetic layers 326a, 326b and the size of the antiferromagnetic layers 326a, 326b are much the same as those of the antiferromagnetic layer 226 in the third embodiment. The thicknesses of the antiferromagnetic layers 326a, 326b can be set, for example, each to approximately 30-200 nm. Furthermore, the thickness of the insulating film 24d can be set, for example, to approximately 5-100 nm.

Figure 26:
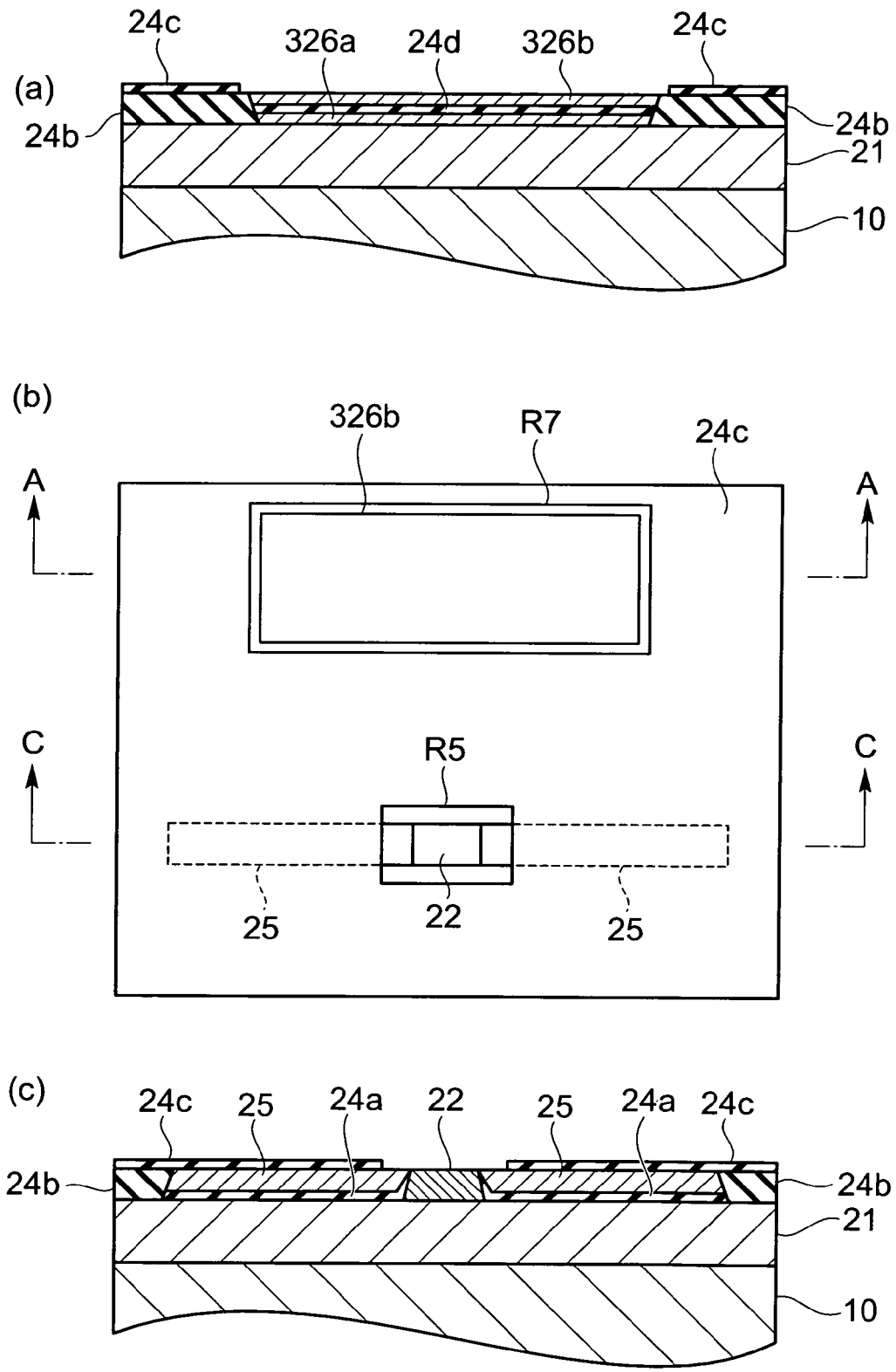
FIG. 26 is a drawing including (a) and (c) sectional views along direction A-A and along direction C-C, respectively, in (b) showing a step in a production process of the reproducing head portion according to the fourth embodiment, and (b) a plan view showing the step in the production process of the reproducing head portion according to the fourth embodiment.

Next, a production method of reproducing head portion 20 forming the thin film magnetic head 300 of the fourth embodiment will be described with reference to FIG. 26. FIG. 26 includes (a) and (c) sectional views along direction A-A and along direction C-C, respectively, in (b) showing a part of the production process of the reproducing head portion according to the fourth embodiment, and (b) a plan view showing a part of the production process of the reproducing head portion according to the fourth embodiment.

The production method of the thin film magnetic head 300 according to the fourth embodiment is the same as the production method of the thin film magnetic head 200 according to the third embodiment, up to the steps of forming the resist film 228 (cf. FIG. 21) and removing the insulating film 24b in the exposed surface region R6 down to the surface of the lower magnetic shield layer 21 by ion milling or the like, using the resist film 228 as a mask.

In the subsequent step, after the insulating film 24b in the region R6 is removed down to the surface of the lower shield layer 21, an antiferromagnetic layer 326a of an antiferromagnetic material, an insulating film 24d of a nonmagnetic insulating material, and an antiferromagnetic layer 326b of an antiferromagnetic material are deposited in the order named, in the region R6 by sputtering or the like (cf. FIG. 26). At this time, in order to provide the lower magnetic shield layer 21 and the upper magnetic shield layer 23 with desired magnetic anisotropy, the antiferromagnetic layers 326a, 326b are formed while applying a magnetic field thereto.

Subsequently, an unrepresented resist film is formed in a region R5 of an approximately rectangular shape to cover the MR element 22 and the neighborhood of the MR element 22, and in a region R7 to cover the antiferromagnetic layer 326b located on the surface. Then, in a state in which this resist film is left, an insulating film 24c of a nonmagnetic insulating material is deposited in the region other than the regions R5, R7 by sputtering or the like. Furthermore, the resist film is removed to effect liftoff, thereby removing the deposited material on the resist film. This results in forming the insulating film 24c in the region other than the regions R5, R7 (cf. FIG. 26). Then the upper magnetic shield layer 23 is deposited over the entire surface of the intermediate body of the reproducing head 20 obtained as described above. The reproducing head portion 20 according to the fourth embodiment is obtained in this manner.

In the thin film magnetic head 300 of the fourth embodiment, as described above, the antiferromagnetic layer 326a is provided in contact with the lower magnetic shield layer 21 which is one of the pair of magnetic shield layers 21, 23, and the antiferromagnetic layer 326b is provided in contact with the upper magnetic shield layer 23 which is the other of the pair of magnetic shield layers 21, 23. For this reason, the direction of magnetization is fixed in the region of the lower magnetic shield layer 21 in contact with the antiferromagnetic layer 326a by exchange interaction between the antiferromagnetic layer 326a and the lower magnetic shield layer 21, and the direction of magnetization is fixed in the region of the upper magnetic shield layer 23 in contact with the antiferromagnetic layer 326b by exchange interaction between the antiferromagnetic layer 326b and the upper magnetic shield layer 23. In consequence, it becomes easier to maintain the domain structure of each magnetic shield layer 21, 23 as the 4-domain structure, it is feasible to suppress the transition between the domain structures in each magnetic shield layer 21, 23 and to stabilize the domain structure, and it thus becomes feasible to achieve further reduction of the Barkhausen noise as compared with the thin film magnetic head 300 of the third embodiment.

The preferred embodiments of the present invention were described above in detail, but it is noted that the present invention is by no means intended to be limited to the embodiments and modifications. For example, the bias-applying layers 25 and the hard magnetic layer 26 were formed in the same step in the embodiment of the present invention, but they may also be formed by separate steps, instead of the same step.

In the embodiment of the present invention the thickness of the bias-applying layers 25 was approximately equal to the thickness of the hard magnetic layer 26, but they may be formed in different thicknesses.

In the embodiment of the present invention the bias-applying layers 25 and the hard magnetic layer 26 were magnetized so that the magnetization direction of the bias-applying layers 25 agreed with the magnetization direction of the hard magnetic layer 26, but the bias-applying layers 25 and the hard magnetic layer 26 may also be magnetized so that the magnetization directions thereof are opposite to each other.

In the embodiment of the present invention the bias-applying layers 25 were formed so that they were rectangular when viewed from the stack direction, but, without having to be limited to this, the invention can be implemented with the bias-applying layers 25 in another shape.

In the third embodiment the insulating film 24c is provided between the antiferromagnetic layer 226 and the upper magnetic shield layer 23, in order to establish insulation between the magnetic shield layers 21, 23, and in the fourth embodiment the insulating film 24d is provided between the antiferromagnetic layer 326a and the antiferromagnetic layer 326b, in order to establish electric insulation between the magnetic shield layers 21, 23. However, the insulating film 24c, 24d does not always have to be provided if an electrically insulating material like an oxide such as NiO is used as an antiferromagnetic material.

The antiferromagnetic layers 226, 326a, 326b were formed with application of a magnetic field in the third and fourth embodiments, but they may be formed as follows: after these antiferromagnetic layers 226, 326a, 326b are formed, the antiferromagnetic layers 226, 326a, 326b are heated to above a blocking temperature (approximately 250° C. where IrMn is used as the material for the antiferromagnetic layers 226, 326a, 326b) with application of a magnetic field, and thereafter they are cooled. In this case, care is needed if the MR element 22 is constructed including an antiferromagnetic material. Specifically, in order to prevent change of the magnetization direction of the pinned layer in the MR element 22, it is preferable to make the antiferromagnetic layers 226, 326a, 326b of an antiferromagnetic material with a blocking temperature lower than that of the antiferromagnetic material in the MR element 22.

What is claimed is:

1. A thin film magnetic head having a medium-facing surface, comprising:
    a pair of magnetic shield layers facing each other, each magnetic shield layer having a first end face forming the medium-facing surface and a second end face located opposite to the first end face;
    a magnetoresistive effect element located between the pair of magnetic shield layers and located on the first end face side;
    a bias-applying layer located between the pair of magnetic shield layers and arranged to apply a bias magnetic field to the magnetoresistive effect element; and
    a hard magnetic layer located between the pair of magnetic shield layers and located closer to the second end face side than the magnetoresistive effect element,
    wherein a length of the hard magnetic layer in a direction perpendicular to the first end face is larger than ⅓ and smaller than ½ of a length of the magnetic shield layers in the direction perpendicular to the first end face.

2. The thin film magnetic head according to claim 1, wherein, when viewed from a stack direction, the hard magnetic layer is rectangular and a side of the hard magnetic layer is arranged in parallel with the first end face.

3. The thin film magnetic head according to claim 2, wherein, when viewed from the stack direction, a length of the hard magnetic layer in a direction along the first end face is larger than the length of the hard magnetic layer in the direction perpendicular to the first end face.

4. The thin film magnetic head according to claim 1, wherein a thickness of the hard magnetic layer in a stack direction is equal to a thickness of the bias-applying layer in the stack direction.

5. The thin film magnetic head according to claim 1, wherein, when viewed from a stack direction, a length of the pair of magnetic shield layers in a direction along the first end face is larger than the length of the pair of magnetic shield layers in the direction perpendicular to the first end face.

6. The thin film magnetic head according to claim 1, wherein a direction of magnetization of the hard magnetic layer is the same as a direction of the bias magnetic field of the bias-applying layer.

7. A thin film magnetic head having a medium-facing surface, comprising:
    a pair of magnetic shield layers facing each other, each magnetic shield layer having a first end face forming the medium-facing surface and a second end face located opposite to the first end face;
    a magnetoresistive effect element located between the pair of magnetic shield layers and located on the first end face side;
    a bias-applying layer located between the pair of magnetic shield layers and arranged to apply a bias magnetic field to the magnetoresistive effect element; and a first antiferromagnetic layer located between the pair of magnetic shield layers, located closer to the second end face side than the magnetoresistive effect element, and arranged directly in contact with one of the pair of magnetic shield layers, wherein a length of the first antiferromagnetic layer in a direction perpendicular to the first end face is larger than 1/3 and smaller than 1/2 of a length of the magnetic shield layers in the direction perpendicular to the first end face.

8. The thin film magnetic head according to claim 7, further comprising a second antiferromagnetic layer located between the pair of magnetic shield layers, located on the second end face side, and arranged in contact with the other of the pair of magnetic shield layers, wherein a length of the second antiferromagnetic layer in the direction perpendicular to the first end face is larger than 1/3 and smaller than 1/2 of the length of the magnetic shield layers in the direction perpendicular to the first end face.

9. The thin film magnetic head according to claim 7, wherein, when viewed from a stack direction, the first antiferromagnetic layer is rectangular and one side of the antiferromagnetic layer is arranged in parallel with the first end face.

10. The thin film magnetic head according to claim 9, wherein, when viewed from the stack direction, a length of the first antiferromagnetic layer in a direction along the first end face is larger than the length of the first antiferromagnetic layer in the direction perpendicular to the first end face.

11. The thin film magnetic head according to claim 7, wherein, when viewed from a stack direction, a length of the pair of magnetic shield layers in a direction along the first end face is larger than the length of the pair of magnetic shield layers in the direction perpendicular to the first end face.

12. The thin film magnetic head according to claim 1, wherein the hard magnetic layer is located between the second end face and the magnetoresistive effect element.

13. The thin film magnetic head according to claim 7, wherein the first antiferromagnetic layer is located between the second end face and the magnetoresistive effect element.

* * * * *